United States Patent
Yang et al.

(10) Patent No.: US 10,735,467 B2
(45) Date of Patent: Aug. 4, 2020

(54) METHOD AND APPARATUS FOR CONTROLLING A DEVICE USING BLUETOOTH TECHNOLOGY

(71) Applicant: LG ELECTRONICS INC., Seoul (KR)

(72) Inventors: Hyunsik Yang, Seoul (KR); Younghwan Kwon, Seoul (KR); Jinkwon Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 197 days.

(21) Appl. No.: 15/403,639

(22) Filed: Jan. 11, 2017

(65) Prior Publication Data

US 2017/0201886 A1 Jul. 13, 2017

Related U.S. Application Data

(60) Provisional application No. 62/277,000, filed on Jan. 11, 2016.

(51) Int. Cl.
| | |
|---|---|
| *H04L 29/06* | (2006.01) |
| *H04W 12/04* | (2009.01) |
| *H04W 12/06* | (2009.01) |
| *H04L 9/08* | (2006.01) |
| *H04W 4/80* | (2018.01) |
| *H04W 12/00* | (2009.01) |
| *H04W 84/20* | (2009.01) |

(52) U.S. Cl.
CPC .......... *H04L 63/18* (2013.01); *H04L 9/0841* (2013.01); *H04L 9/0861* (2013.01); *H04W 4/80* (2018.02); *H04W 12/003* (2019.01); *H04W 12/0023* (2019.01); *H04W 12/04* (2013.01); *H04W 12/06* (2013.01); *H04L 2209/80* (2013.01); *H04W 84/20* (2013.01)

(58) Field of Classification Search
CPC ........ H01L 63/18; H04W 4/80; H04W 12/04; H04W 12/06; H04W 84/20; H04W 12/0023; H04W 12/003; H04W 12/00305; H04L 9/0841; H04L 9/0861; H04L 2209/80

See application file for complete search history.

(56) References Cited

U.S. PATENT DOCUMENTS

| | | | |
|---|---|---|---|
| 2013/0316649 A1* | 11/2013 | Newham | H04W 88/04 455/41.2 |
| 2015/0373760 A1* | 12/2015 | Palin | H04W 76/023 455/41.2 |

(Continued)

*Primary Examiner* — Linglan E Edwards
*Assistant Examiner* — Forrest L Carey
(74) *Attorney, Agent, or Firm* — Birch, Stewart, Kolasch & Birch, LLP

(57) ABSTRACT

The present invention relates to a method and an apparatus for controlling connection between a first device and a second device by a control device using Bluetooth LE (Low Energy). According to the present invention, there are provided a method and an apparatus for obtaining pairing information from the first device and the second device to generate information for establishing connection between the first device and the second device and transmitting the generated information to the first device and the second device to control the first device and the second device to establish connection of a predetermined security level or higher.

8 Claims, 21 Drawing Sheets

(56) References Cited

U.S. PATENT DOCUMENTS

| | | | |
|---|---|---|---|
| 2016/0088424 A1* | 3/2016 | Polo | H04W 4/80 |
| | | | 455/41.1 |
| 2016/0360341 A1* | 12/2016 | Srivatsa | H04L 67/104 |
| 2017/0142763 A1* | 5/2017 | Bao | H04W 76/023 |
| 2017/0257472 A1* | 9/2017 | Gehring | H04M 1/7253 |

* cited by examiner

[Fig.1]
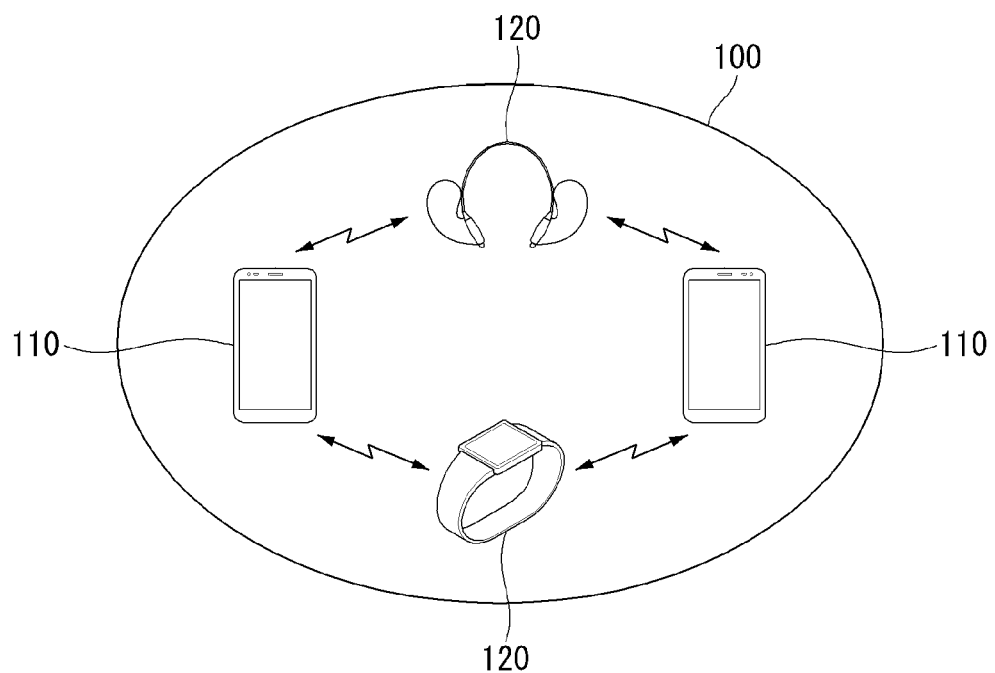

[Fig.2]
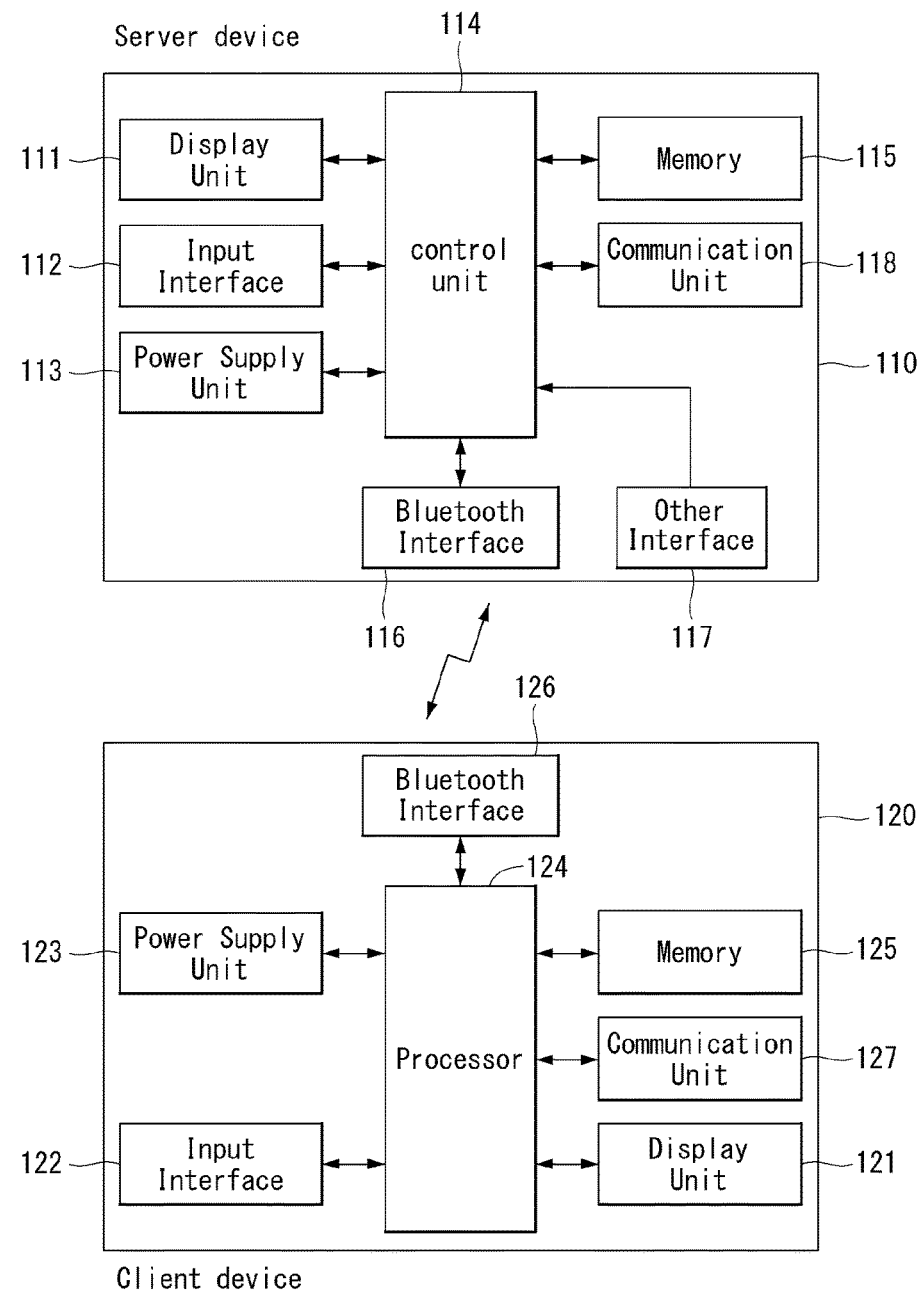

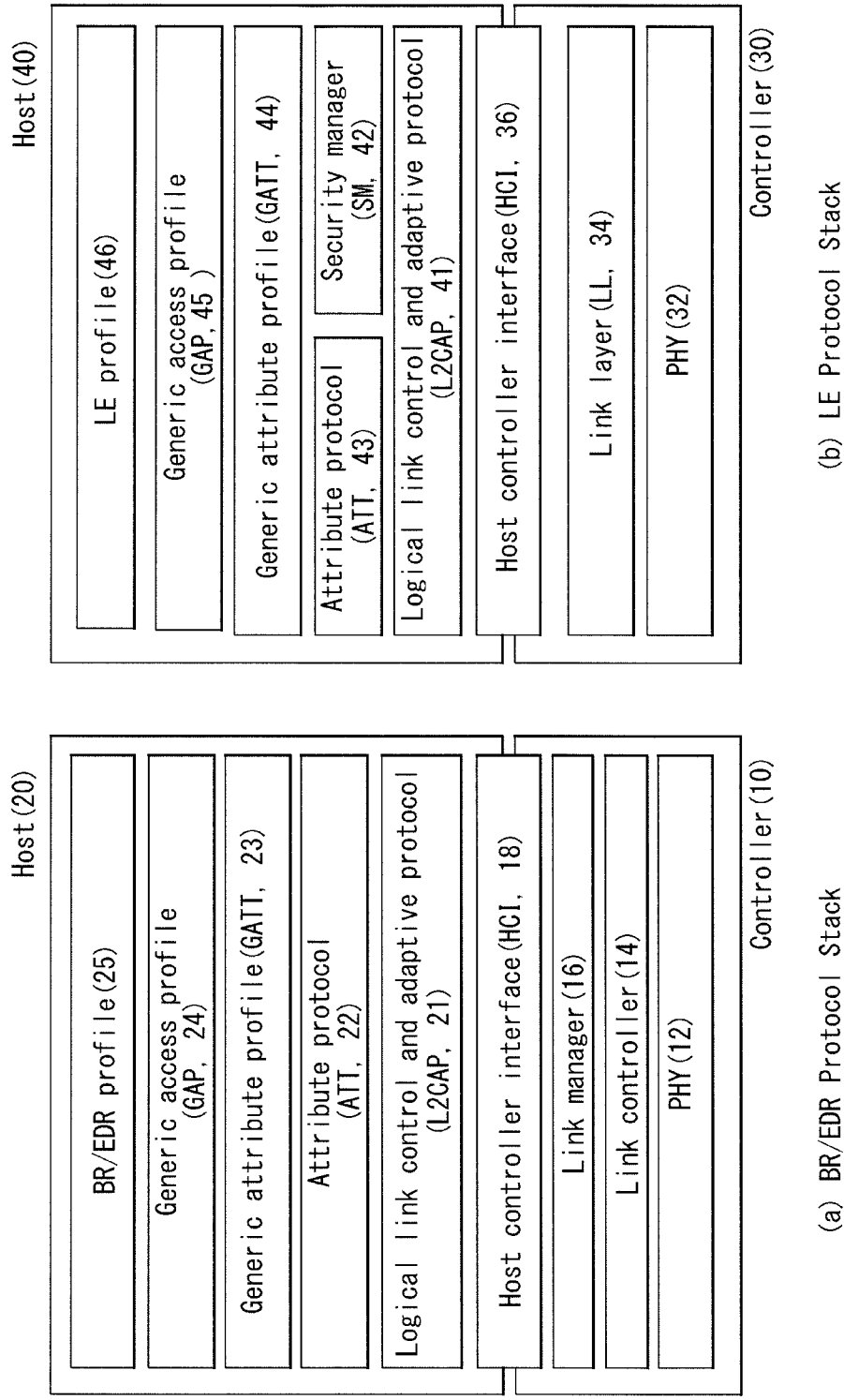

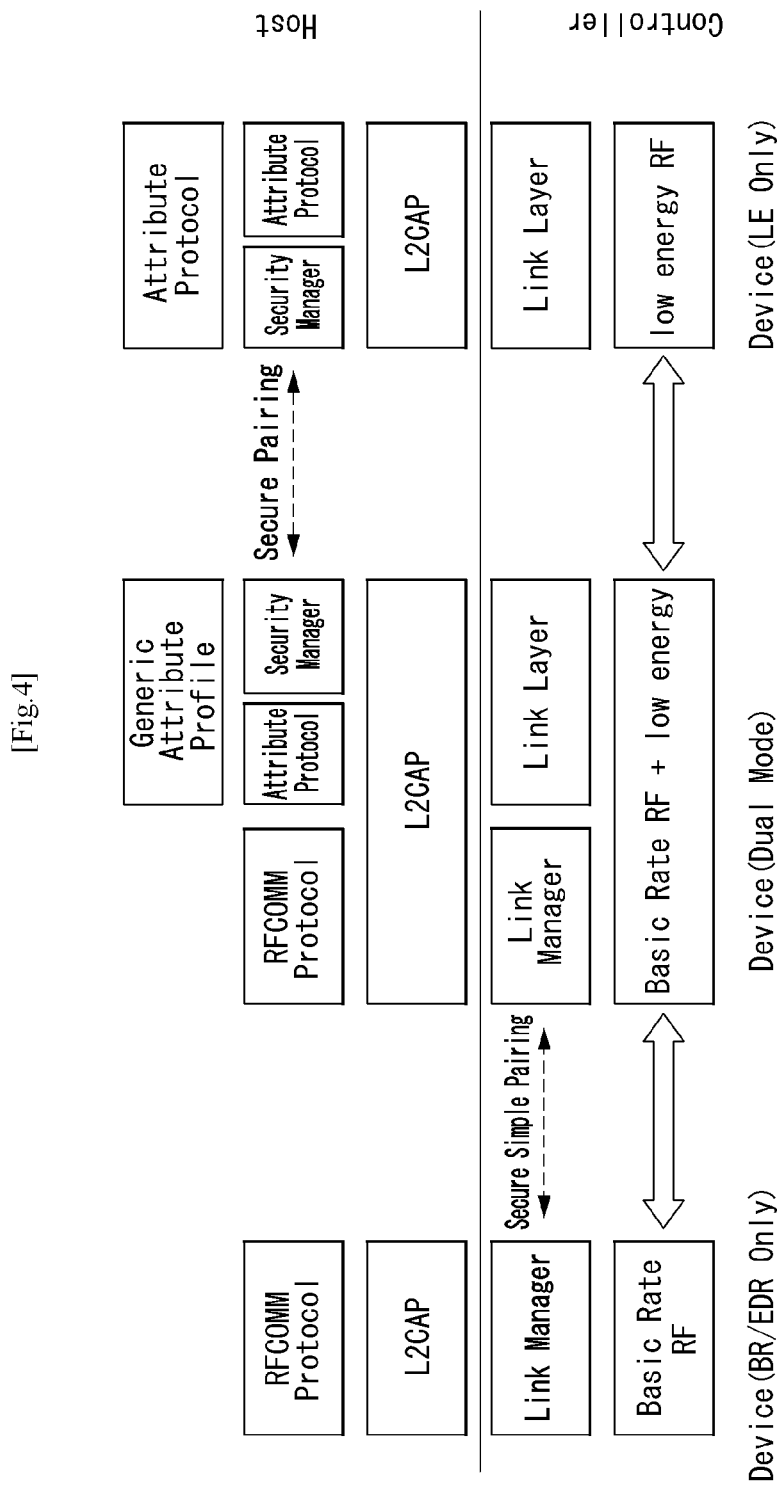
[Fig.4]

[Fig.5]
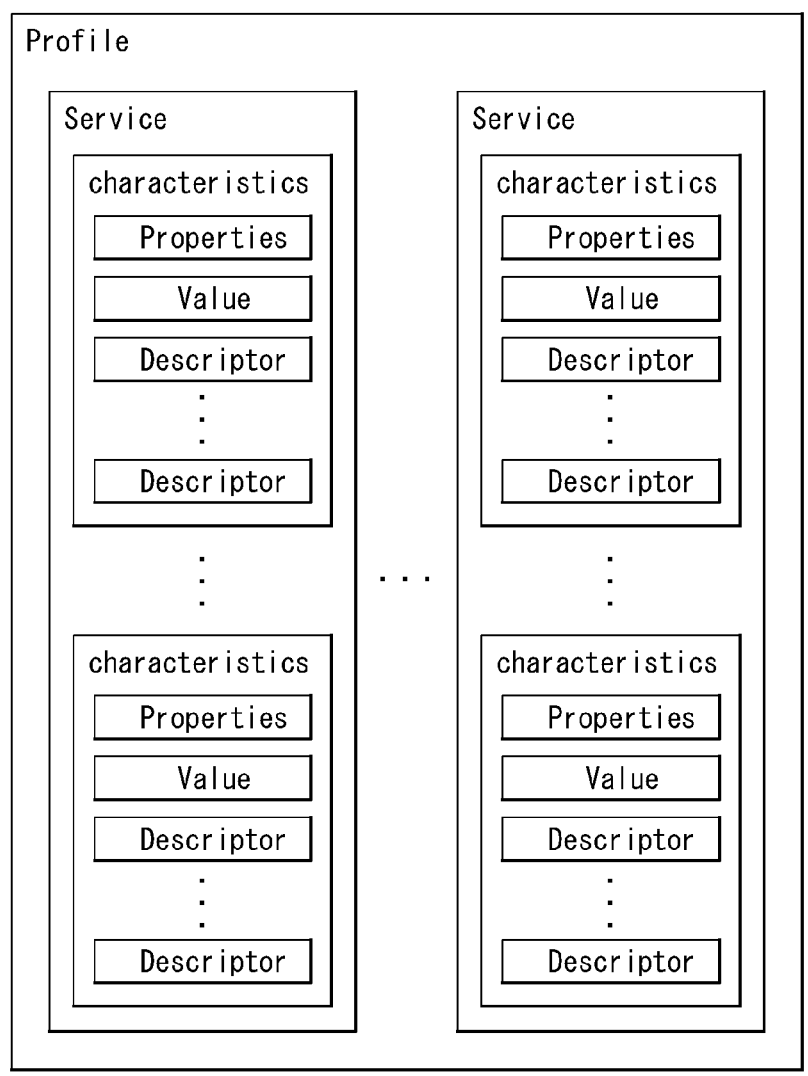

[Fig.6]
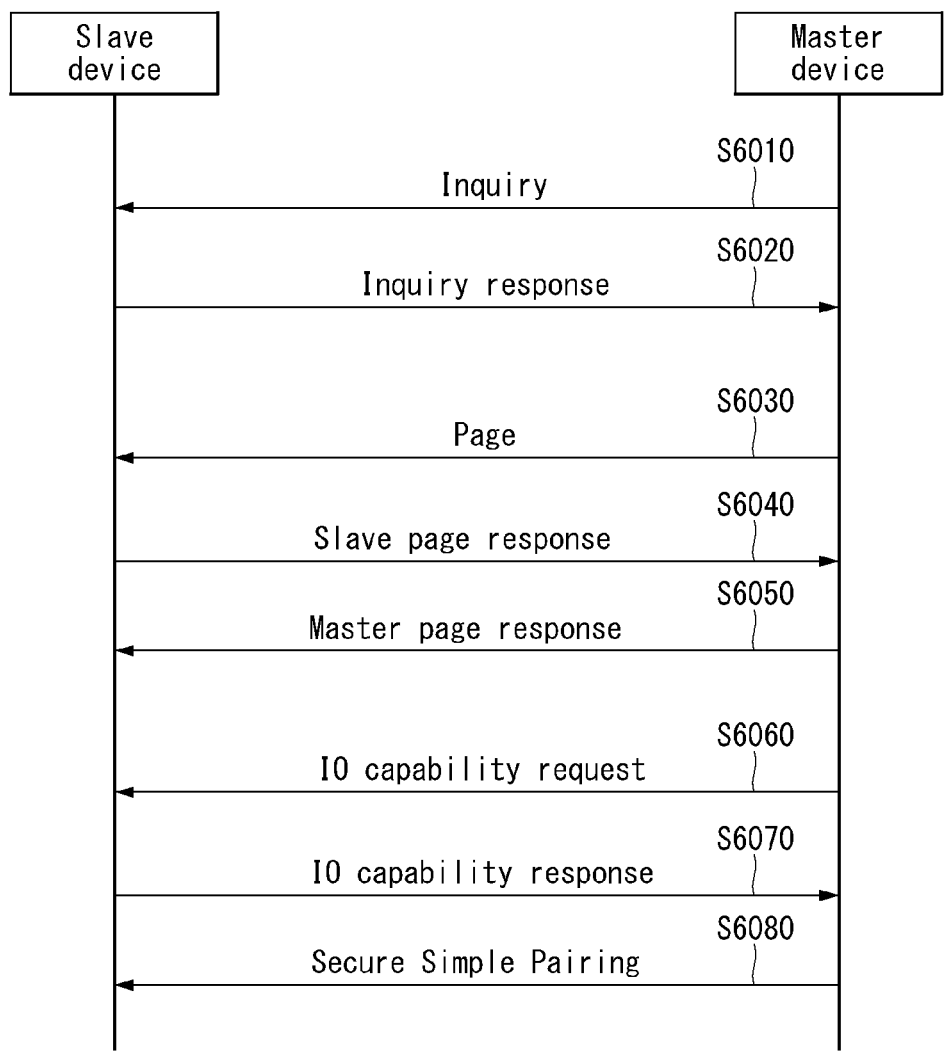

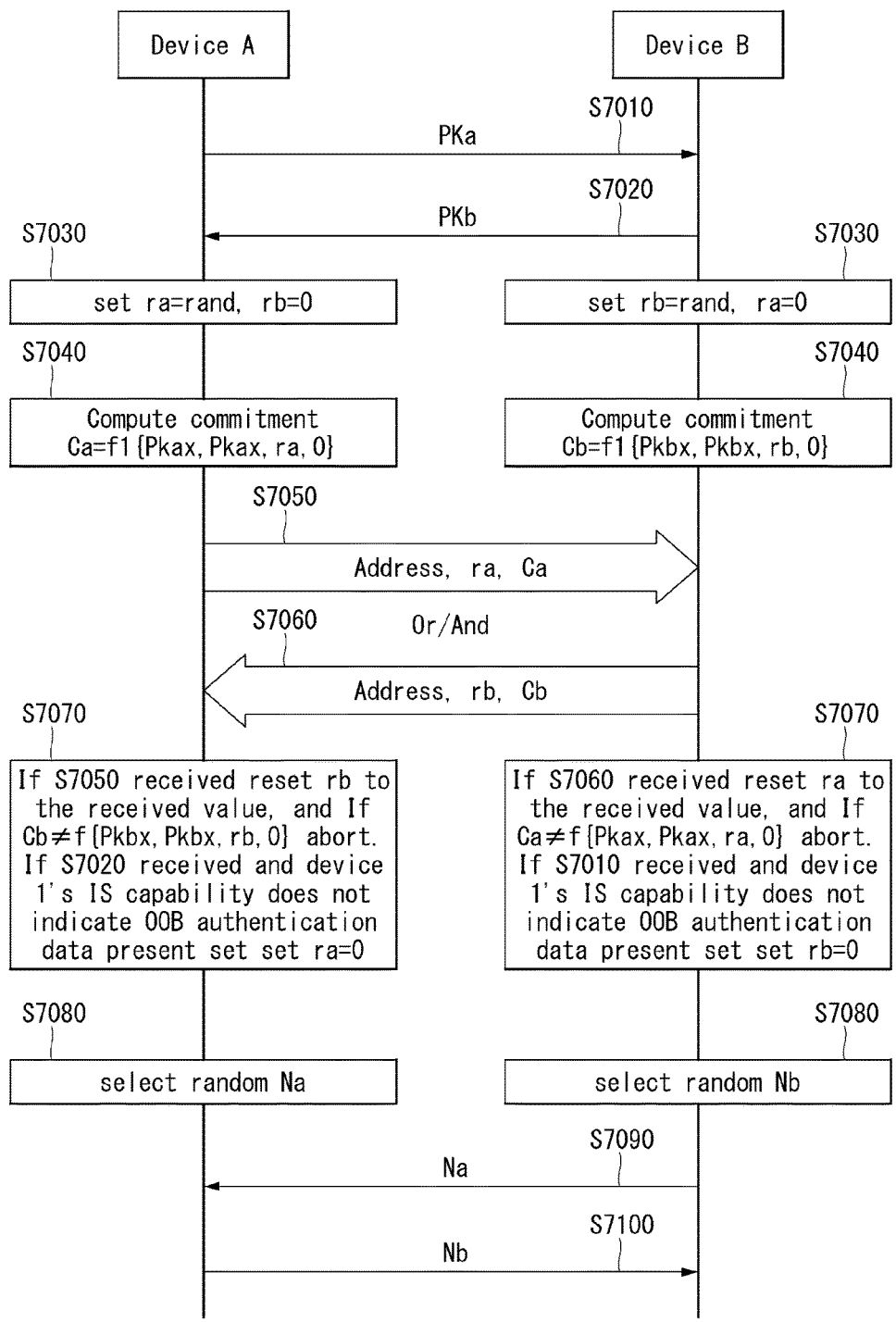
[Fig.7]

[Fig.8]
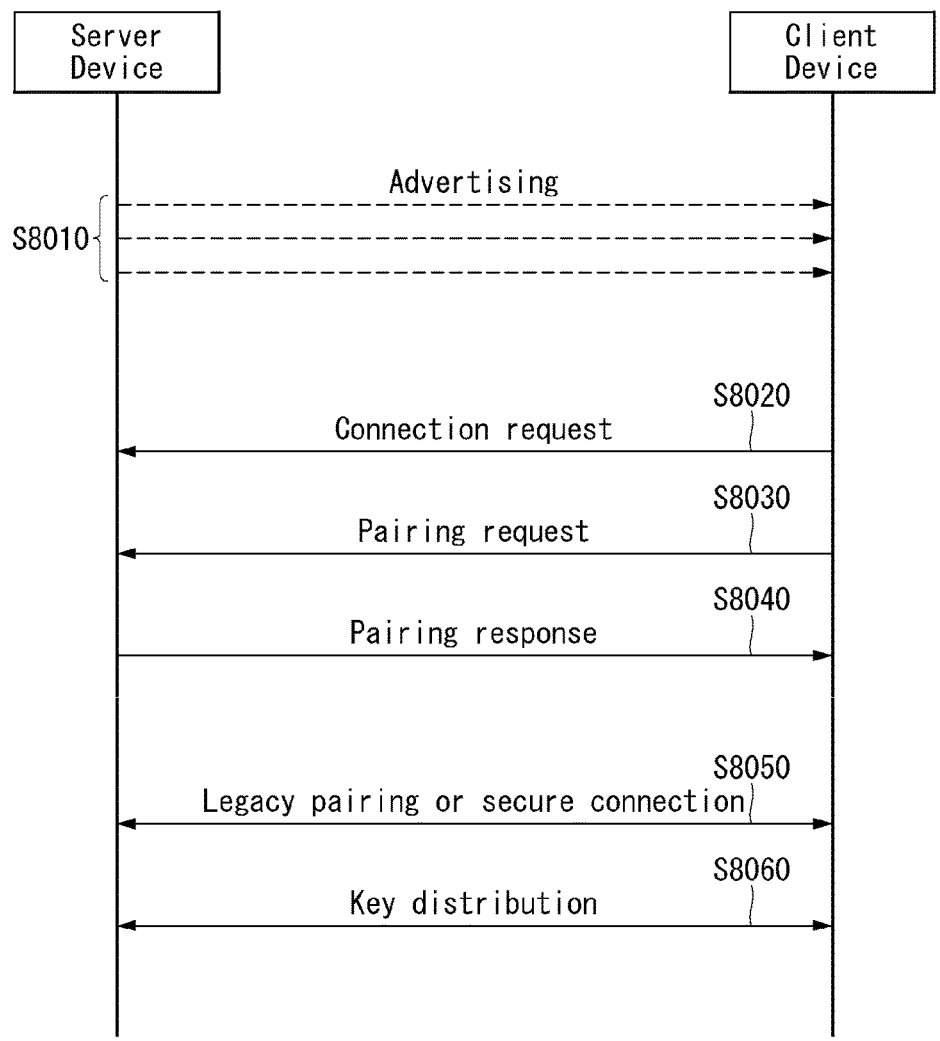

[Fig.9]
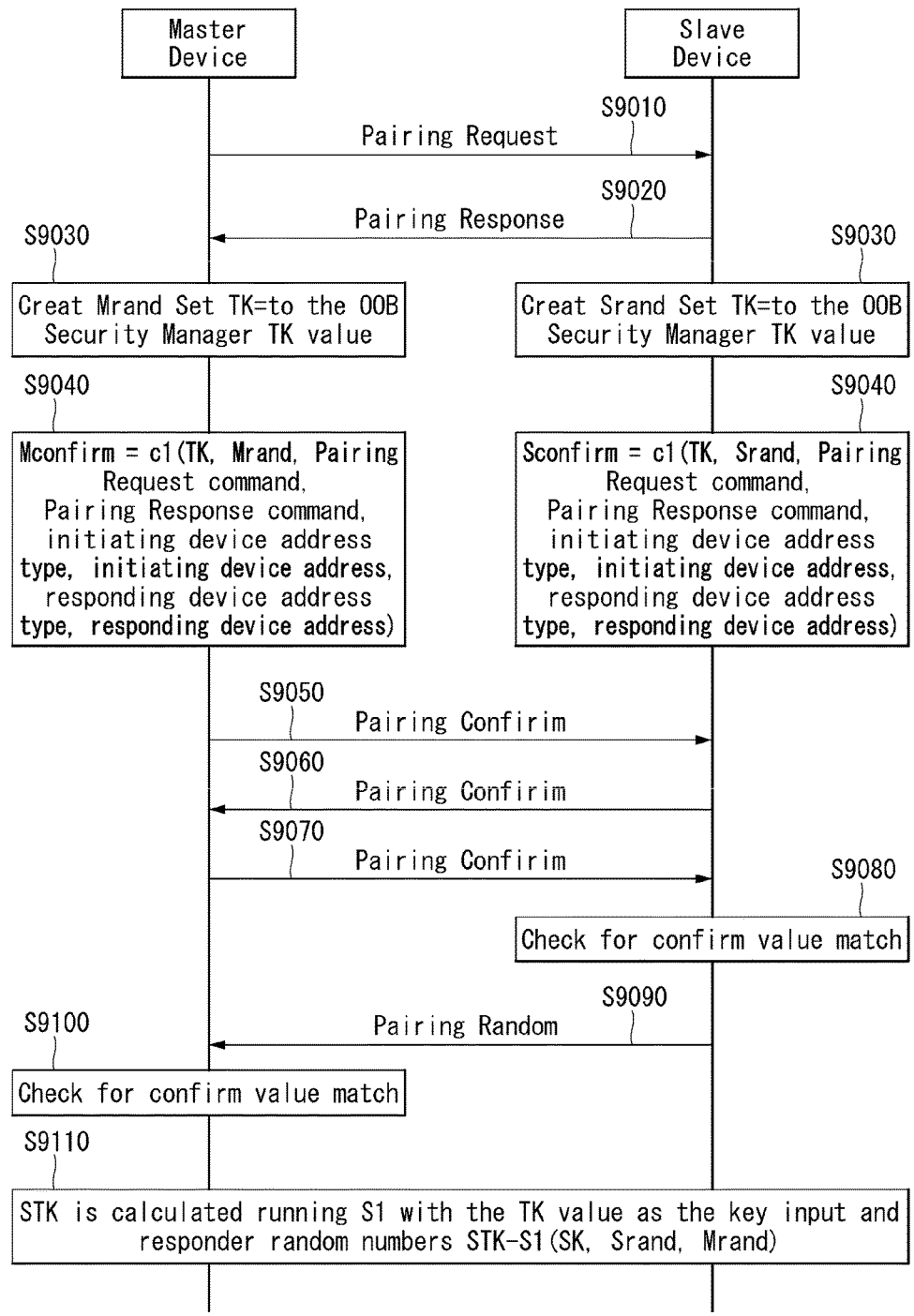

[Fig.10]
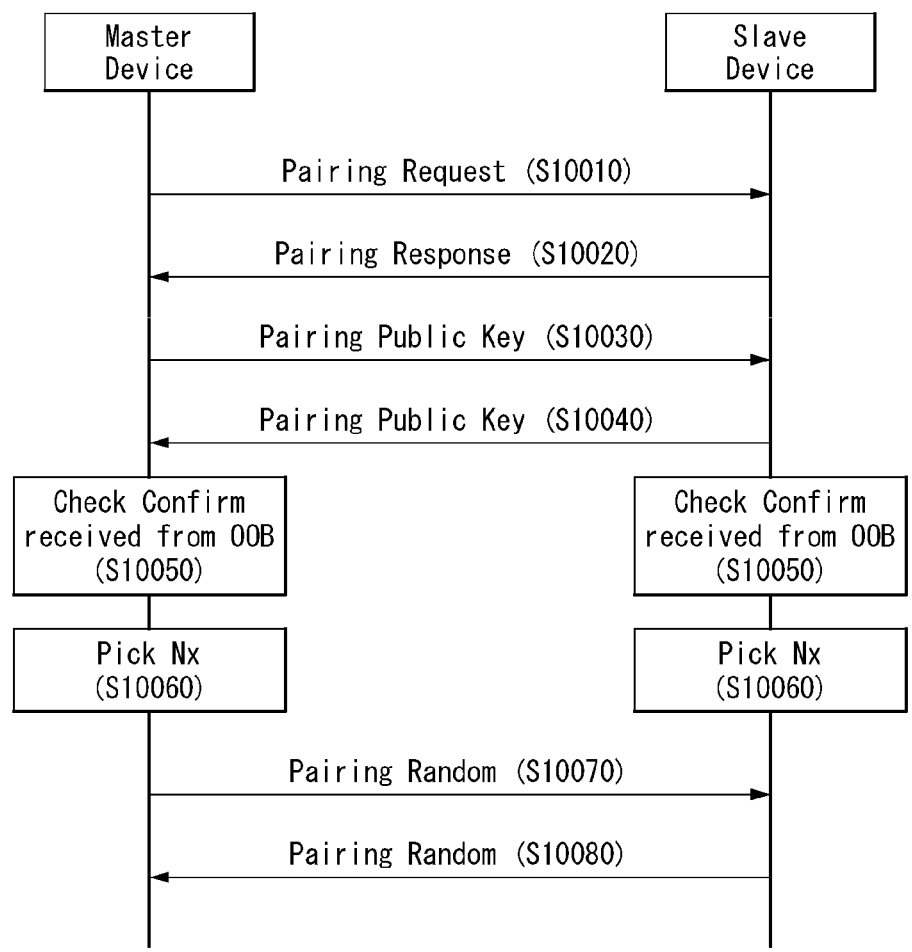

[Fig.11]
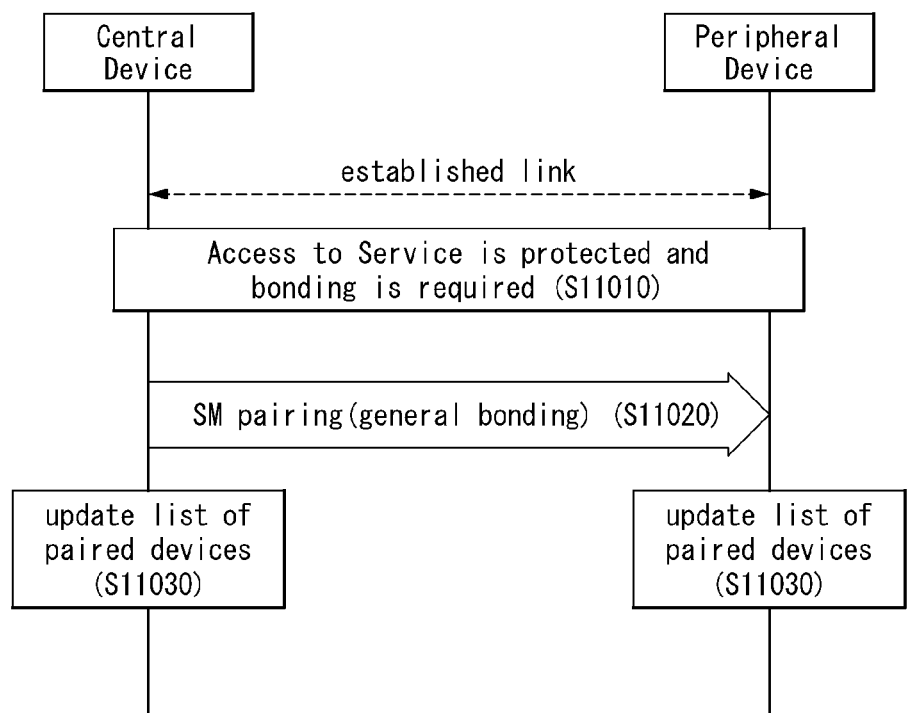

[Fig.12]
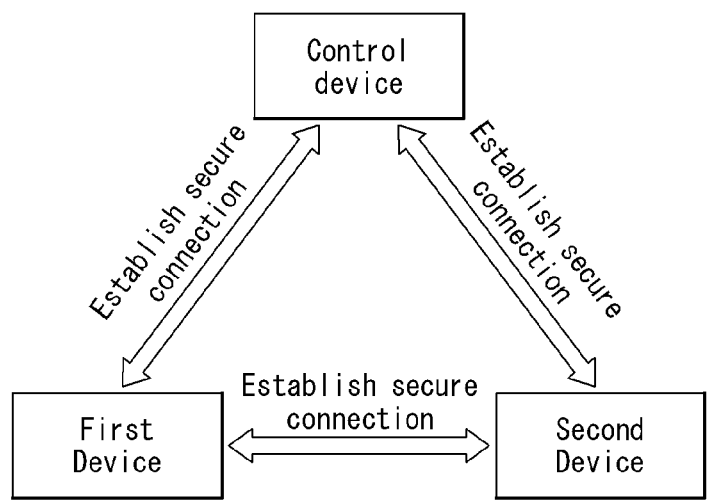

[Fig.13]
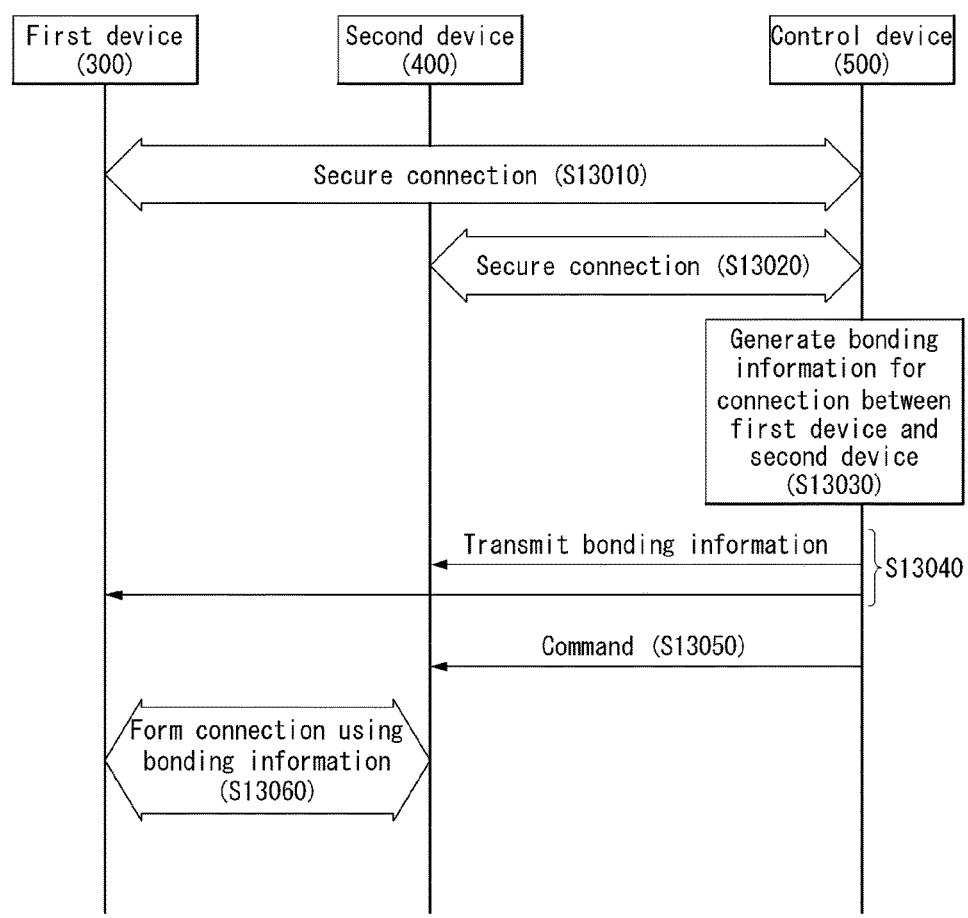

[Fig.14]
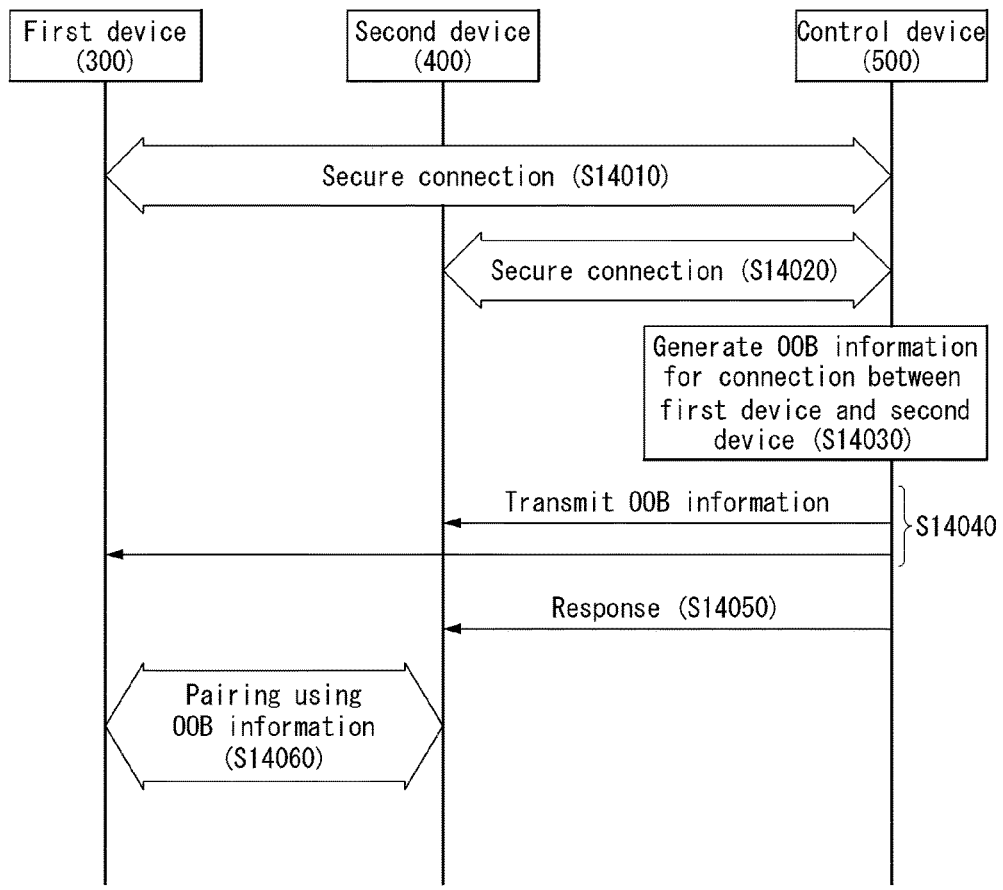
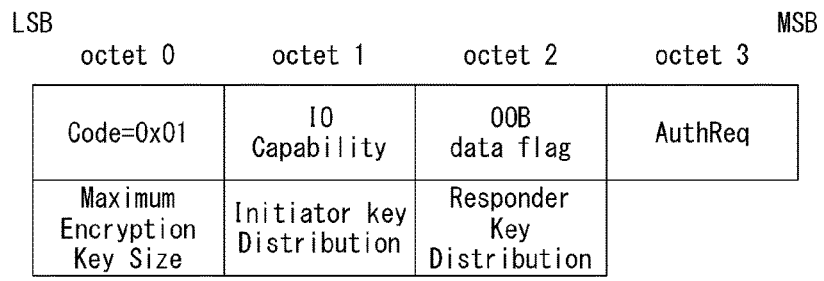
(a) Pairing capability information

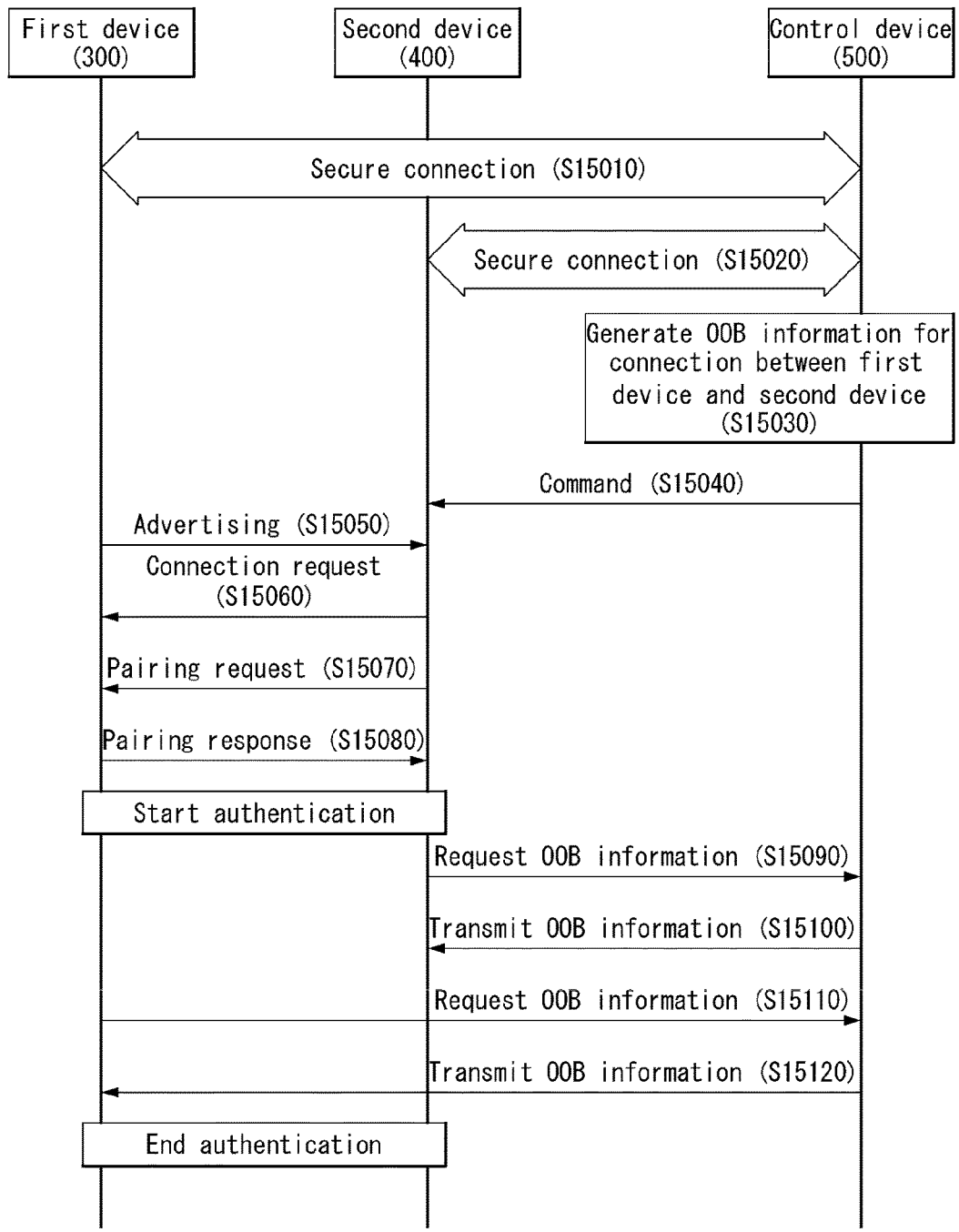
[Fig.15]

[Fig.16]
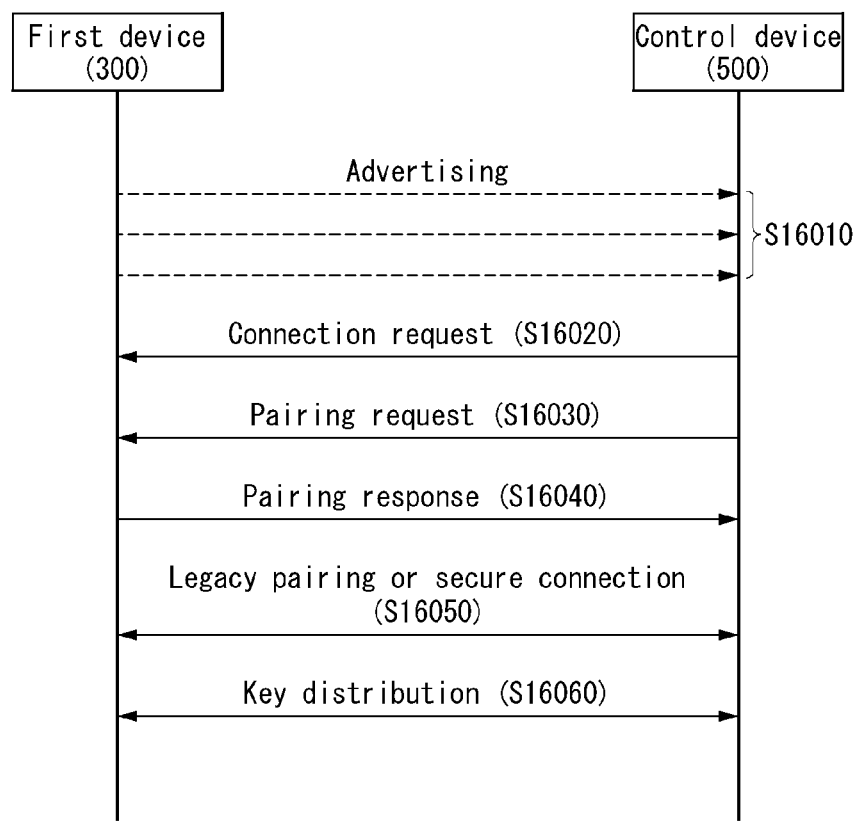
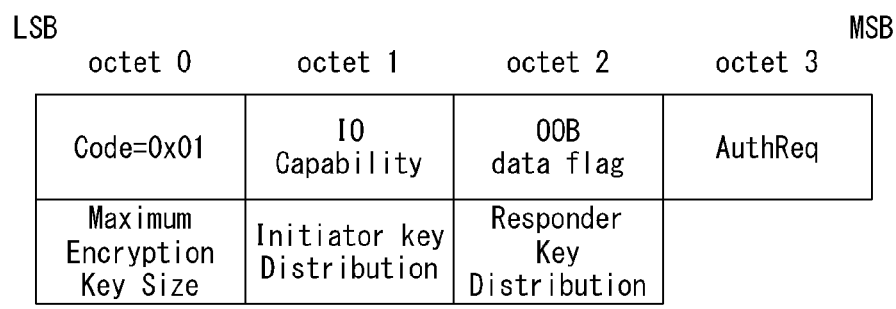
(a) Pairing request and pairing response packet

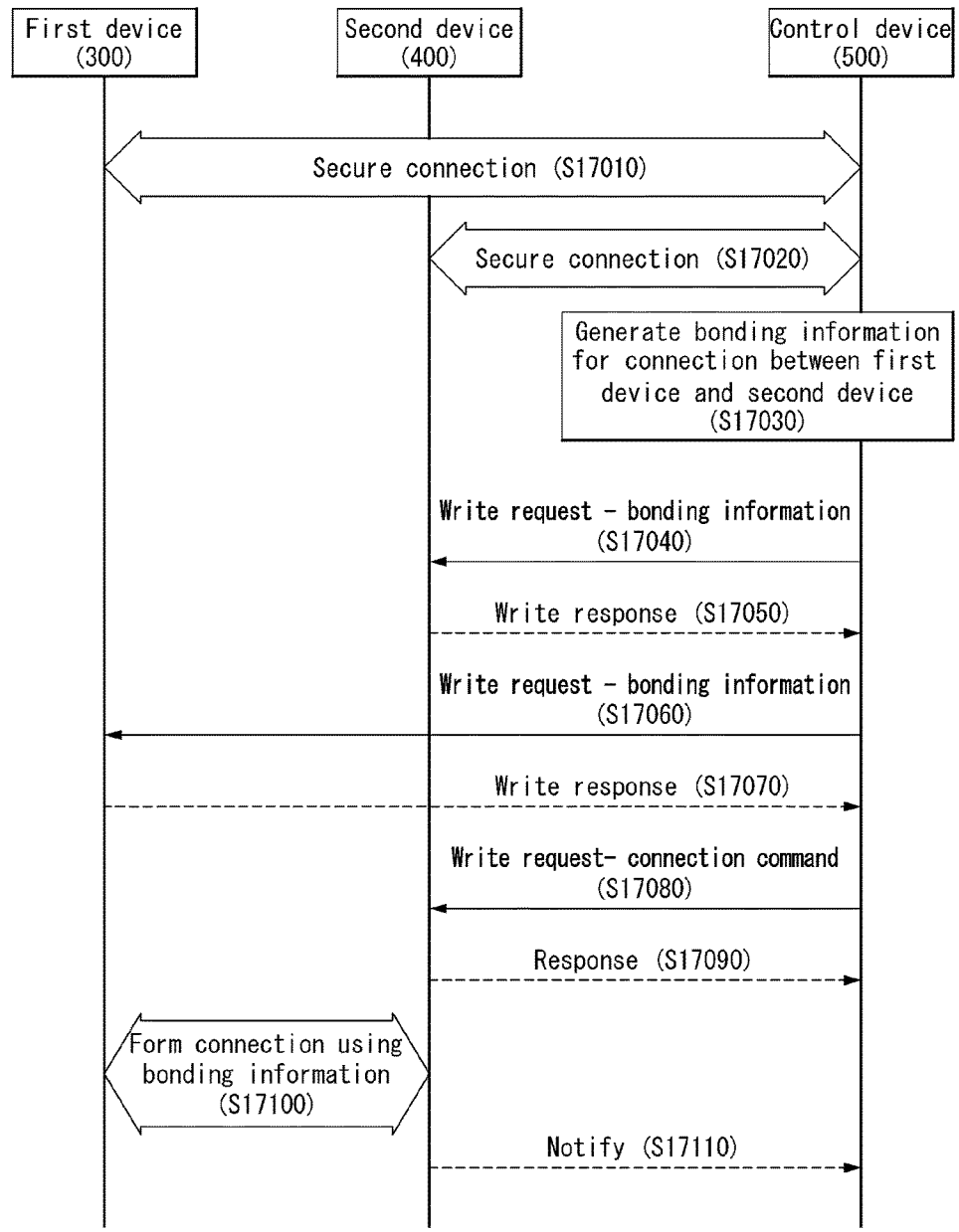

[Fig.18]

| Characteristic Name | Requirement | Mandatory Properies |
|---|---|---|
| Bonding Device Info | M | Write |
| Bonding information (LTK) | M | Write |
| Bonding information (EDIV) | M | Write |
| Bonding information (Rand) | M | Write |
| Bonding information (IRK) | M | Write |
| Bonding information (CSRK) | M | Write |
| Connection Command | M | Write, Notification |

Characteristics - bonding information

[Fig.19]
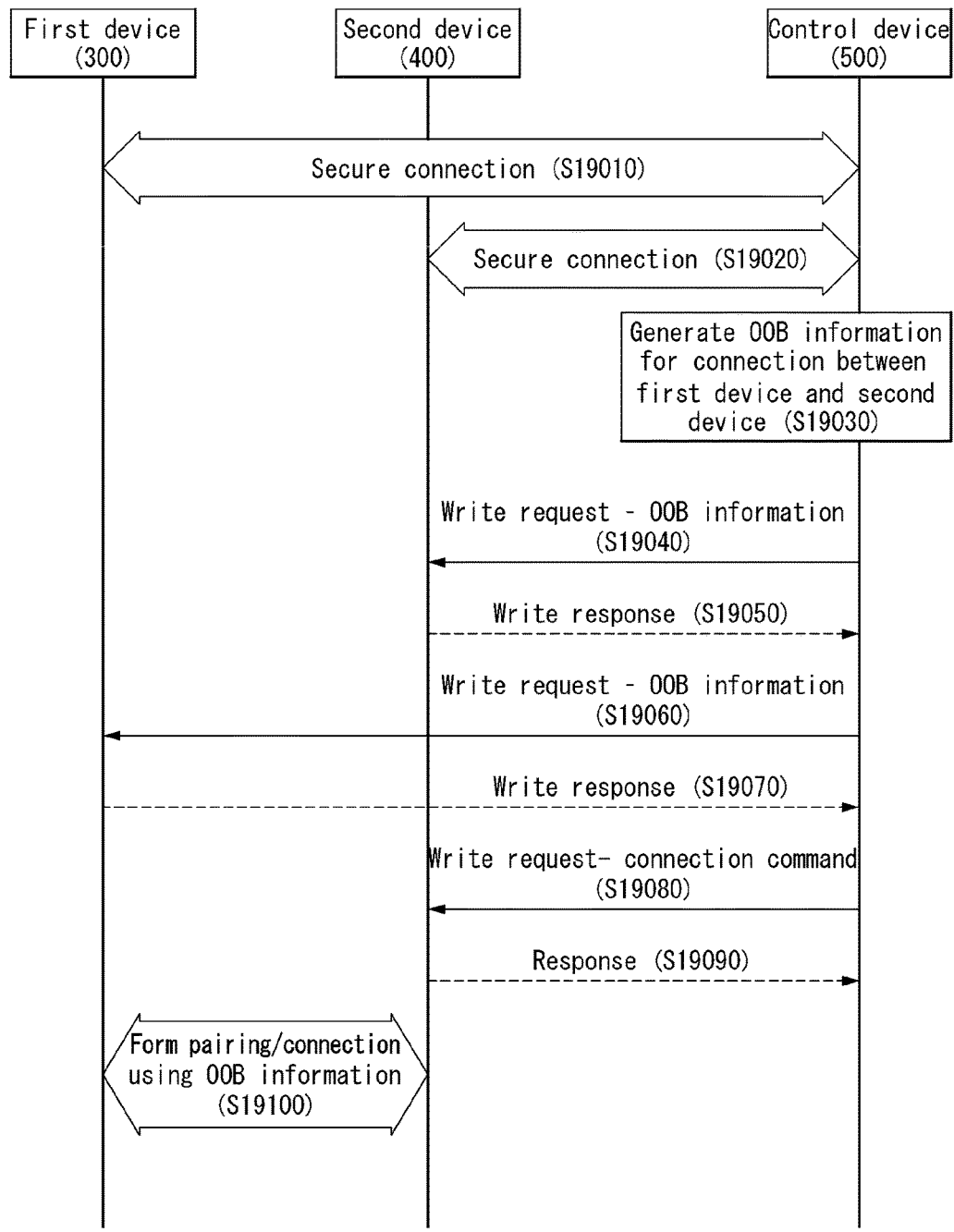

[Fig.20]

| Characteristic Name | Requirement | Mandatory Properies | Size |
|---|---|---|---|
| LE Legacy OOB information (TK) | M | Write | 000000~999999 (decimal number) |
| LE Secure Conn OOB information (rx) | M | Write | 128bit |
| LE Secure Conn OOB information (Cx) | M | Write | 128bit |
| BT Address | O | Write | 48bit |
| Connection Command | M | Write, Notification | 1byte |

Characteristics - OOB information

[Fig.21]
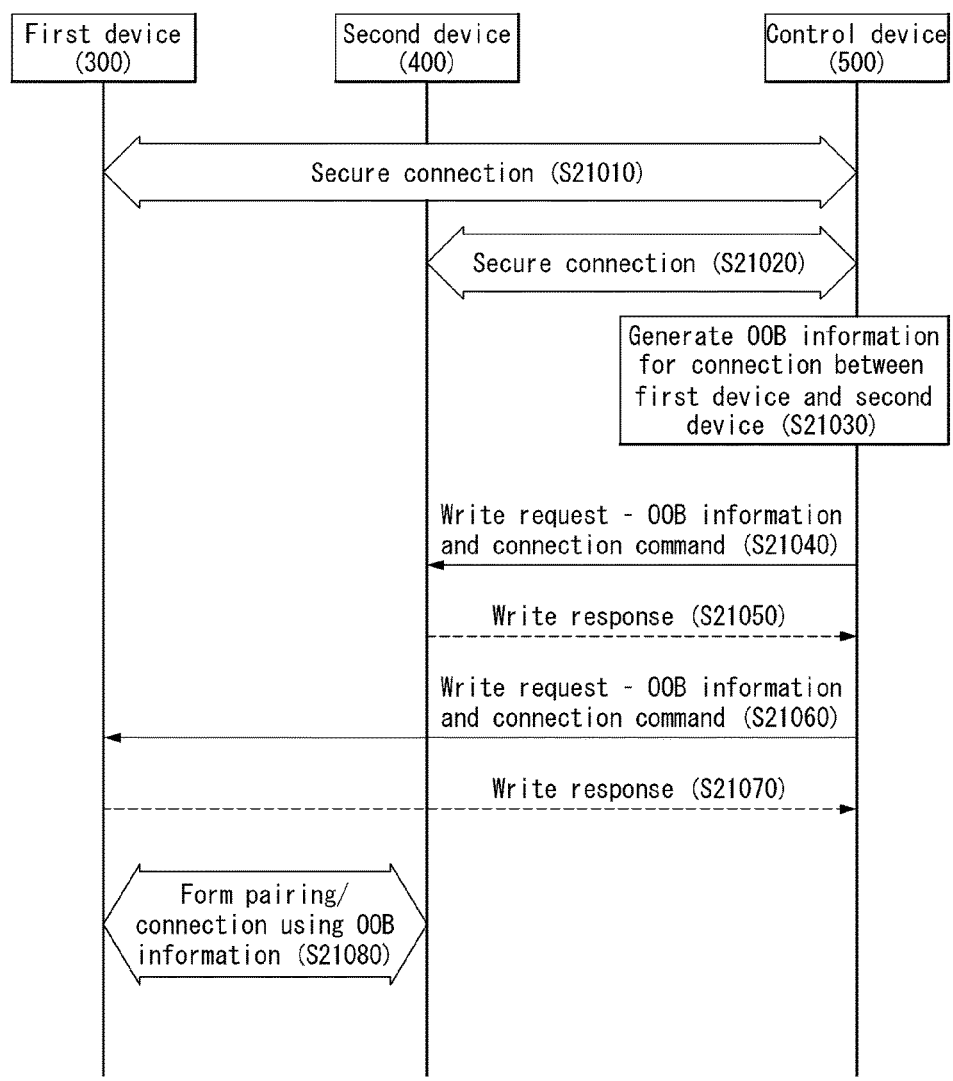

METHOD AND APPARATUS FOR CONTROLLING A DEVICE USING BLUETOOTH TECHNOLOGY

CROSS-REFERENCE TO RELATED APPLICATION

This application claims priority to Provisional Application No. 62/277,000 filed on Jan. 11, 2016 in US, the entire contents of which is hereby incorporated by reference in its entirety.

BACKGROUND OF THE INVENTION

Field of the Invention

The present invention relates to a method and an apparatus for establishing connection between devices using Bluetooth corresponding to short-range wireless communication technology in a wireless communication system and, particularly, to a method and an apparatus for establishing secure connection between devices through a control device using Bluetooth.

Discussion of the Related Art

Bluetooth is a short-range wireless technology standard that can wirelessly connect various types of devices and allows them to exchange data over short distances. To enable wireless communication between two devices using Bluetooth communication, a user has to perform the process of discovering Bluetooth devices to communicate with and making a connection request. As used herein, the term "device" refers to an appliance or equipment.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

SUMMARY OF THE INVENTION

An object of the present invention is to provide a method and a device for controlling a device using Bluetooth.

Another object of the present invention is to provide a method and a device for establishing connection of a high security level between devices through a control device.

The present invention can achieve connection between devices with a high security level by transmitting and receiving information for secure connection between devices through a control device having an input unit and an output unit.

Technical tasks obtainable from the present invention are non-limited by the above-mentioned technical task and, other unmentioned technical tasks can be clearly understood from the following description by those having ordinary skill in the technical field to which the present invention pertains.

The present invention provides a method for controlling first and second devices through a control device using Bluetooth to solve the aforementioned problems.

Specifically, a method for controlling connection between a first device and a second device by a control device using Bluetooth LE (Low Energy) includes: obtaining, from the first device, first pairing information for establishing first connection of a first security level with the first device; obtaining, from the second device, second pairing information for establishing second connection of a second security level with the second device; generating bonding information or out of band (OOB) information for establishing third connection between the first device and the second device based on the first pairing information and the second pairing information; transmitting the bonding information or the OOB information to the first device and the second device; and transmitting, to the first device, a command indicating the first device to establish the third connection of a third security level with the second device based on the security information, wherein the third security level is the same as the first security level or the second security level.

The method may further includes: establishing the first connection with the first device in order to obtain the first pairing information; and storing the first pairing information.

The method may further include: establishing the second connection with the second device in order to obtain the second pairing information; and storing the second pairing information.

The first pairing information and the second pairing information may be obtained through connection using out of band, passkey entry or numeric comparison.

The first pairing information may include at least one of the address of the first device, a public key of the first device, a maximum key size supported when the first device performs an encryption procedure and a key type generated or distributed when the first device establishes connection through a secure channel, and the second pairing information may include at least one of the address of the second device, a public key of the second device, a maximum key size supported when the second device performs an encryption procedure or a key type generated and distributed when the second device establishes connection through a secure channel.

The bonding information may include at least one of a seed key used to generate an encryption key of each of the first device and the second device, an identification value for identifying a long term key (LTK) when legacy pairing is performed, an identification key for restoring a random address to a public address or a message authentication key for verifying data.

The OOB information may include at least one of the address of each of the first device and the second device, a temporary key (TK) for performing legacy pairing, a commitment value or a random value.

The method may further include receiving a notification message indicating a result of the third connection from the first device.

In addition, a method for controlling connection between a first device and a second device by a control device using Bluetooth LE includes: obtaining, from the first device, first pairing information for establishing first connection of a first security level with the first device; obtaining, from the second device, second pairing information for establishing second connection of a second security level with the second device; generating bonding information or OOB information for establishing third connection between the first device and the second device based on the first pairing information and the second pairing information; transmitting, to the first device, a command indicating the first device to establish the third connection of a third security level with the second device; receiving, from the first device and the second device, a request message requesting the bonding information or the OOB information; and transmitting the bonding information or the OOB information to the first device and the second device, wherein the third security level is the same as the first security level or the second security level.

Furthermore, a control device for controlling connection between a first device and a second device using Bluetooth LE includes: a communication unit for communicating with the outside in a wireless or wired manner; a memory for storing data; and a processor functionally connected with the communication unit, wherein the processor is configured: to obtain, from the first device, first pairing information for establishing first connection of a first security level with the first device; to obtain, from the second device, second pairing information for establishing second connection of a second security level with the second device; to generate bonding information or OOB information for establishing third connection between the first device and the second device based on the first pairing information and the second pairing information; to transmit the bonding information or the OOB information to the first device and the second device; and to transmit, to the first device, a command indicating the first device to establish the third connection of a third security level with the second device based on the security information, wherein the third security level is the same as the first security level or the second security level.

The processor may be configured to establish the first connection with the first device in order to obtain the first pairing information and to store the first pairing information in the memory.

The processor may be configured to establish the second connection with the second device in order to obtain the second pairing information and to store the second pairing information in the memory.

The first pairing information and the second pairing information may be obtained through connection using out of band, passkey entry or numeric comparison.

The first pairing information may include at least one of the address of the first device, a public key of the first device, a maximum key size supported when the first device performs an encryption procedure or a key type generated and distributed when the first device establishes connection through a secure channel, and the second pairing information may include at least one of the address of the second device, a public key of the second device, a maximum key size supported when the second device performs an encryption procedure or a key type generated and distributed when the second device establishes connection through a secure channel The bonding information may include at least one of a seed key used to generate an encryption key of each of the first device and the second device, an identification value for identifying a long term key (LTK) when legacy pairing is performed, an identification key for restoring a random address to a public address or a message authentication key for verifying data.

The OOB information may include at least one of the address of each of the first device and the second device, a temporary key (TK) for performing legacy pairing, a commitment value or a random value.

The processor may be configured to receive a notification message indicating a result of the third connection from the first device.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings:

FIG. 1 is a schematic diagram illustrating an example of a wireless communication system using a Bluetooth low energy technology proposed in this specification;

FIG. 2 is a block diagram of a device capable of realizing methods proposed in the specification;

FIGS. 3 and 4 illustrate an example of a Bluetooth communication architecture to which the methods proposed in the specification are applicable;

FIG. 5 illustrates an example of a generic attribute profile (GATT) of Bluetooth low energy;

FIG. 6 is a flowchart illustrating a method for forming connection between devices using Bluetooth BR/EDR;

FIG. 7 is a flowchart illustrating an example of a pairing method in the case of Bluetooth BR/EDR connection;

FIG. 8 is a flowchart illustrating a method of forming connection between devices using Bluetooth LE;

FIG. 9 is a flowchart illustrating an example of a pairing method when Bluetooth LE connection is formed;

FIG. 10 is a flowchart illustrating another example of the pairing method when Bluetooth LE connection is formed;

FIG. 11 is a flowchart illustrating an example of a bonding method in Bluetooth LE;

FIG. 12 is a schematic diagram illustrating an example of a method for forming secure connection between devices controlled by a control device to which the present invention is applied;

FIG. 13 is a flowchart illustrating an example of a method for forming secure connection between devices controlled through the control device to which the present invention is applied;

FIG. 14 is a flowchart illustrating another example of the method for forming secure connection between devices controlled through the control device to which the present invention is applied;

FIG. 15 is a flowchart illustrating another example of the method for forming secure connection between devices controlled through the control device to which the present invention is applied;

FIG. 16 is a flowchart illustrating an example of a method of acquiring information for forming secure connection between devices controlled by the control device in Bluetooth LE to which the present invention is applied;

FIGS. 17 and 18 illustrate an example of a method of acquiring information for forming secure connection between devices controlled by the control device in Bluetooth LE to which the present invention is applied and characteristics;

FIGS. 19 and 20 illustrate another example of the method of acquiring information for forming secure connection between devices controlled by the control device in Bluetooth LE to which the present invention is applied and characteristics; and FIG. 21 is a flowchart illustrating another example of the method for forming secure connection between devices controlled by the control device in Bluetooth LE to which the present invention is applied.

DETAILED DESCRIPTION OF THE EMBODIMENTS

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

FIG. 1 is a schematic diagram illustrating an example of a wireless communication system using Bluetooth low energy technology proposed in the specification.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The server device 120 may also be called as data service device, slave device, slave, server, conductor, host device, gateway, sensing device, monitoring device, first device, or the like, and the client device 110 may also be called as master device, master, client, member, sensor device, sink device, collector, second device, third device, and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

FIG. 2 is a block diagram of a device capable of realizing methods proposed in the specification.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules which receive external power and internal power and provide power necessary for operation of components under the control of the processor.

As described above, BLE technology has a small duty cycle and can remarkably reduce power consumption through a low data rate.

The input units 112 and 122 refer to modules which provide user input through a screen button, for example, to the controller such that the user can control device operation.

FIGS. 3 and 4 illustrate an example of a Bluetooth communication architecture to which methods proposed in this specification are applicable.

Referring to FIG. 3, FIG. 3(a) illustrates an example of a Bluetooth BR (Basic Rate)/EDR (Enhanced Data Rate) protocol stack and FIG. 3(b) illustrates an example of a Bluetooth LE (Low Energy) protocol stack.

Specifically, as illustrated in FIG. 3(a), the Bluetooth BR/EDR protocol stack may include a controller stack 10 and a host stack 20 above and below a host controller interface (HCI) 18.

The host stack (or host module) 20 refers to hardware for transmitting or receiving Bluetooth packets to or from a wireless transceiver module receiving 2.4 GHz Bluetooth signals and is connected to the Bluetooth module corresponding to the controller stack 10 to control the Bluetooth module and perform operations.

The controller stack 10 may include a PHY layer 12, a link controller layer 14 and a link manager layer 16.

The PHY layer 12 transmits and receives 2.4 GHz radio signals and can hop 79 RF channels and transmit data when GFSK (Gaussian Frequency Shift Keying) modulation is used.

The link controller layer 14 serves to transmit digital signals, selects a channel sequence hopping 1400 times per second and transmits a 625 µs time slot per channel.

The link manager layer 16 controls overall operations (link setup, control and security) of Bluetooth connection using LMP (Link Manager Protocol).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 define a service (profile) using the Bluetooth BR/EDR and define an application protocol for exchanging data, and the generic access profile (GAP) 24 defines device discovering, connecting a device and security level.

As illustrated in FIG. 3(b), the Bluetooth LE protocol stack includes a controller stack 30 operable to process a wireless device interface for which timing is important and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include the Generic Access Profile (GAP) 40, the logical link control and adaptation protocol (L2CAP) 41, the Security Manager (SM) 42, the Attribute Protocol (ATT) 440, the Generic Attribute Profile (GATT) 44, the Generic Access Profile 25 and the LE profile 46. However, the host stack 40 is not limited thereto, but may include other various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

In the Bluetooth LE, three fixed channels (one for a signaling channel, one for a security manager, and one for an attribute protocol) are basically used, and dynamic channel may be used as necessary.

In contrast, in the BR/EDR, a dynamic channel is basically used, and a protocol service multiplexer, retransmission, streaming mode, and the like, are supported.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

Request and Response message: A request message is a message for a client device to request specific information from a server device, and the response message, as a response message with respect to the request message, refers to a message transmitted from the server device to the client device.

Command message: It is a message transmitted from the client device to the server device in order to indicate a command of a specific operation. The server device does not transmit a response with respect to the command message to the client device.

Notification message: It is a message transmitted from the server device to the client device in order to notify an event, or the like. The client device does not transmit a confirmation message with respect to the notification message to the server device.

Indication and confirmation message: It is a message transmitted from the server device to the client device in order to notify an event, or the like. Unlike the notification message, the client device transmits a confirmation message regarding the indication message to the server device.

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

Service: It defines a basic operation of a device by a combination of behaviors related to data Include: It defines a relationship between services Characteristics: It is a data value used in a server Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

1̂ Battery: Battery information exchanging method
2̂ Time: Time information exchanging method
3̂ FindMe: Provision of alarm service according to distance
4̂ Proximity: Battery information exchanging method
5̂ Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

As illustrated in FIG. 4, devices may support Bluetooth BR/EDR or LE and may operate in a dual mode supporting both Bluetooth BR/EDR and LE.

A device operating in the dual mode can establish secure connection with a device supporting only Bluetooth BR/EDR through secure simple pairing using a link manager and establish secure connection with a device supporting only LE through a security manager.

A description will be given of procedures of the BLE technology.

The BLE procedures may be classified into a device filtering procedure, an advertising procedure, a scanning procedure, a discovery procedure and a connection procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

Here, the undirected broadcast is advertizing toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response as a response with respect to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is teamed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
|---|---|
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 5 illustrates an example of a structure of a GATT (Generic Attribute Profile) of Bluetooth low energy.

Referring to FIG. 5, the structure for exchange of Profile Data of Bluetooth Low Energy will be described.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 on the basis of a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute
Type: Type of attribute
Value: Value of attribute
Permission: Right to access attribute The present invention proposes a method for acquiring combination information on a device to be controlled by a control device through the GATT and information related to controllable operation to control the device.

FIG. 6 is a flowchart illustrating a method for establishing connection between devices using Bluetooth BR/EDR.

As illustrated in FIG. 6, a connection procedure at Bluetooth BR/EDR may include the following steps.

The connection procedure may also be referred to as a pairing procedure.

The Bluetooth pairing procedure is divided into a pairing state and a standby state.

A Bluetooth paired device enters the connected state and a connected device operates in the standby state.

In addition, Bluetooth devices may be connected with a specific device through the connection procedure and then perform a re-connection procedure for re-connection.

The re-connection procedure may be the same as the connection procedure.

Specifically, a master device enters the standby state when power is applied thereto.

Subsequently, the master device performs an inquiry procedure to discover neighbor devices for Bluetooth connection.

That is, the master device can enter an inquiry state for discovering a neighbor connectable device (slave) and the slave device can enter an inquiry scan state for receiving an ID packet transmitted from the neighbor device (master) in the inquiry state.

The master device in the inquiry state transmits an inquiry message using an ID packet one time or at predetermined intervals to discover a neighbor connectable device (S6010).

The ID packet may be a GIAC (General Inquiry Access Code) or a DIAC (Dedicated Inquiry Access Code).

The slave device transmits a frequency hopping sequence (FHS) for Bluetooth pairing with the master device upon reception of the GIAC or DIAC corresponding to the ID packet transmitted from the master device.

In addition, the slave device may transmit an extended inquiry response (EIR) to the master device when there is data to be transmitted as necessary (S6020).

Upon discovery of a neighbor connectable Bluetooth device through the inquiry procedure, a paging procedure is performed (S6030).

The paging procedure refers to a step of synchronizing a hopping sequence using address and clock information to perform actual connection upon discovery of a neighbor connectable Bluetooth device through the inquiry procedure.

Specifically, the paging procedure may be divided into (1) a step S6030 of transmitting a page from the master device to the slave device, (2) a step S6040 of transmitting a slave page response from the slave device to the master device, (3) a step S6050 of transmitting a master page response from the master device to the slave device.

Upon completion of the inquiry procedure and the paging procedure, the master device and the slave device perform a security establishment step (S6080) and then perform L2CAP connection and a service discovery step.

Prior to the security establishment step, the master device and the slave device exchange input/output (I/O) capability with each other (S6060 and S6070).

This step may be performed through an I/O capability request message and an I/O capability response message.

In addition, the security establishment step may include a secure simple pairing procedure or may be interpreted as the same as the secure simple pairing procedure.

The L2CAP (Logical Link Control and Adaption Protocol) is a packet type protocol and has characteristics similar to the UDP protocol. While the L2CAP has a packet size of a maximum of 672 bytes, the packet size can be changed to a maximum of 65,535 bytes when communication starts.

After the L2CAP connection and service discovery step, the master device can transmit data input from a user to the slave device.

Upon performing the connection procedure, the master device and the slave device switch to a sleep state to prevent energy consumption when there is no data exchange therebetween for a predetermined time and the connected state is ended.

Then, the master device and the slave device perform the re-connection procedure to transmit/receive data again.

The re-connection procedure can be performed through the same steps as the aforementioned connection procedure.

FIG. 7 is a flowchart illustrating an example of a pairing method when Bluetooth BR/EDR connection is established.

FIG. 7 illustrates specific steps of a Bluetooth BR/EDR secure simple pairing procedure through out of band in FIG. 6. Out of band refers to performing a secure simple pairing procedure through a short-range communication method (e.g., NFC) other than Bluetooth.

Initially, each device generates its own Elliptic Curve Diffie-Hellman (ECDH) public-private key pair. This key pair needs to be generated only once per device and may be computed in advance of pairing. A device may, at any time, choose to discard its public-private key pair and generate a new one, although there is not a requirement to do so.

Pairing is initiated by the initiating device (device A) sending its public key to the receiving device (S7010). The responding device (device B) replies with its own public key (S7020) These public keys are not regarded as secret although they may identify the devices. Note that steps S7010 and S7020 are the same in all three protocols.

When both device's Controllers and Hosts support Secure Connections, the P-256 elliptic curve is used. When at least one device's Controller or Host doesn't support Secure Connections, the P-192 elliptic curve is used.

The Out-of-Band protocol is used when authentication information has been received by at least one of the devices and indicated in the OOB Authentication Data Present parameter in the LMP IO capability exchange sequence. The mode in which the discovery of the peer device is first done in-band and then followed by the transmission of authentication parameters through OOB interface is not supported. The sequence diagram for Authentication Stage for Out of Band from the cryptographic point of view is shown below:

Principle of Operation:

If both devices can transmit and/or receive data over an out-of-band channel, then mutual authentication will be based on the commitments of the public keys (Ca and Cb) exchanged OOB in Authentication stage. If OOB communication is possible only in one direction, then authentication of the device receiving the OOB communication will be based on that device knowing a random number r sent via OOB. In this case, r must be secret: r can be created afresh every time, or access to the device sending r must be restricted (S7030). If r is not sent by a device, it is assumed to be 0 by the device receiving the OOB information in step S7050 or S7060.

Roles of A and B:

The OOB Authentication Stage protocol is symmetric with respect to the roles of A and B. It does not require that device A always will initiate pairing and it automatically resolves asymmetry in the OOB communication, e.g. in the case when one of the devices has an NFC tag and can only transmit OOB.

Order of Steps:

The public key exchange must happen before the verification S7070. In the diagram the in-band public key exchange between the devices is done before the OOB communication (S7040, S7050, S7060).

But when the pairing is initiated by an OOB interface, public key exchange will happen after the OOB communication (S7010 will be between S7060 and S7070).

Values of ra and rb: Since the direction of the peer's OOB interface cannot be verified before the OOB communication takes place, a device should always generate and if possible transmit through its OOB interface a random number r to the peer. Each device applies the following rules locally to set the values of its own r and the value of the peer's r:

1. Initially, r of the device is set to a random number and r of the peer is set to 0 (S7030).
2. If a device has received OOB, it sets the peer's r value to what was sent by the peer (S7070).
3. If the remote device's OOB Authentication Data parameter sent in the LMP IO capabilities exchange sequence is set to No OOB Data Received, it sets its own r value to 0 (S7070)

These rules ensure that when entering Authentication Stage 2, both A and B have the same values for ra and rb if OOB communication took place.

Each device selects a pseudorandom 128-bit nonce (S7080). That is, the following Nx value is selected.

Nx: Nonce (unique random number) from device X

This value is used to prevent replay attacks and must be freshly generated with each instantiation of the pairing protocol. This value should be generated directly from a physical source of randomness or with a good pseudo-random generator seeded with a random value from a physical source.

The initiating and responding devices then exchange their respective nonce values (S7090 and S7100) and the initiating device confirms the commitment. A failure at this point indicates the presence of an attacker or other transmission error and causes the protocol to abort. The protocol may be repeated with or without the generation of new public-private key pairs, but new nonces must be generated if the protocol is repeated.

FIG. 8 is a flowchart illustrating a method of establishing connection between devices using Bluetooth LE.

A server device transmits an advertisement message to a client device through 3 advertisement channels (S8010).

The server device may be called an advertiser before connection and called a master device after connection. An example of the server device may be a sensor (temperature sensor or the like).

In addition, the client may be called a scanner before connection and called a slave device after connection. An example of the slave device may be a smartphone.

As described, Bluetooth performs communication using a total of 40 channels through a 2.4 GHz band. Three of the 40 channels are advertisement channels and are used to exchange packets transmitted/received to establish connection including various advertising packets.

The remaining 37 channels are data channels and are used for data packet exchange after connection.

The client device may transmit a scan request to the server device to acquire additional data (e.g., a server device name and the like) from the server device upon reception of the advertisement message.

Then, the server device sends a scan response including the remaining data to the client in response to the scan request.

Here, the scan request and the scan response are a kind of advertising packet. The advertising packet can include only user data of 31 bytes or less.

Accordingly, in the case of data greater than 31 bytes and having overhead too large to be transmitted through connection, the data is divided and sent twice using the scan request/scan response.

Then, the client device transmits a connection request for Bluetooth connection with the server device to the server (S8020).

Accordingly, link layer (LL) connection between the server device and the client device is established.

Thereafter, the server device and the client device perform a security establishment procedure.

The security establishment procedure may be interpreted as secure simple pairing or may include the same.

That is, the secure establishment procedure can be performed through phase 1 to phase 3 steps.

Specifically, a pairing step (phase 1) is performed between the server and the client.

In the pairing step, the client device transmits a pairing request to the server device (S8030) and the server device transmits a pairing response to the client device (S8040).

In phase 2, legacy pairing or secure connection is performed between the server device and the client device (S8050).

Security in Bluetooth LE uses the following keys and values for encryption, signing and random addressing.

Identity Resolving Key (IRK): a 128-bit key used to generate and resolve a random address.

Connection Signature Resolving Key (CSRK): a 128-bit key used for data signature and confirmation of signatures in a receiving device.

Long Term Key (LTK): a 128-bit key used to generate a contributory key with respect to encrypted connection.

Encrypted Diversifier (EDIV): a 16-bit stored value used to identify an LTK distributed during LE legacy pairing. A new EDIV is generated whenever a unique LTK is distributed.

Random Number (Rand): a 64-bit stored value used to identify an LTK distributed during LE legacy pairing. A new RAND is generated whenever a unique LTK is distributed.

In SSP phase 3, a key distribution procedure is performed between the server device and the client device (S8060).

Through this procedure, secure connection is established between the server and the client and encrypted data can be transmitted and receive therebetween.

FIG. 9 is a flowchart illustrating an example of a pairing method when Bluetooth LE connection is formed.

Referring to FIG. 9, devices can establish secure connection using a secure channel through a Bluetooth LE legacy pairing procedure.

Specifically, a master device and a slave device exchange a pairing feature. That is, the master device can start the pairing procedure by sending a pairing request command to the slave device (S9010).

Here, the pairing request command may include the following information.

IO Capability: input/output device supported by a device.
OOB data flag: flag indicating whether the device supports out of band.
AuthReq
Maximum Encryption Key Size: a maximum key length supported during encryption.
Initiator Key Distribution: a key that needs to be distributed/generated (indicated through bit setting)
Responder Key Distribution: a key that needs to be distributed/generated (indicated through bit setting).

The slave device transmits a pairing response message to the master device in response to the pairing request command (S9020). The pairing response message includes information of the same type as the pairing request command.

Upon exchange of the pairing feature, one of available short-term key generation sequences (e.g., Just Works, Passkey Entry, Out of Band and the like) is selected and used.

Furthermore, the slave device may request that the master device start the security procedure by sending a security request message including "AuthReq" before the master device transmits the pairing request message.

A description will be given of a case in which Out of Band is selected as an example.

The master device generates a 128-bit random number (Mrand) (S9030).

The master device calculates the 128-bit confirm value (Mconfirm) using the confirm value generation function c1 as shown in Equation 1 below with the input parameter k set to TK, the input parameter r set to Mrand, the input parameter preq set to Pairing Request command as exchanged with the peer device (i.e. without any modifications), the input parameter pres set to the Pairing Response command as exchanged with the peer device (i.e. without any modifications), the input parameter iat set to the initiating device address type, is set to the initiating device address, rat set to the responding device address type and ra set to the responding device address (S9040).

$$\text{Mconfirm} = c1(TK, \text{Mrand, Pairing Request command, Pairing Response command, initiating device address type, initiating device address, responding device address type, responding device address}) \quad [\text{Equation 1}]$$

Master device and slave device addresses used for confirmation generation shall be device addresses used during connection setup.

The slave device generates a 128-bit random number (Srand) (S9030).

The responding device calculates the 128-bit confirm value (Sconfirm) using the confirm value generation function c1 as shown in Equation 2 below with the input parameter k set to TK, the input parameter r set to Srand, the input parameter preq set to Pairing Request command, the input parameter pres set to the Pairing Response command, the input parameter iat set to the initiating device address type and ra set to the responding device address (S9040).

$$\text{Sconfirm} = c1(TK, \text{Srand, Pairing Request command, Pairing Response command, initiating device address type, initiating device address, responding device address type, responding device address}) \quad [\text{Equation 2}]$$

The master device transmits Mconfirm to the slave device (S9050). When the slave device receives Mconfirm it transmits Sconfirm to the master device (S9060). When the master device receives Sconfirm it transmits Mrand to the slave device (S9070).

The slave device verifies the Mconfirm value by repeating the calculation the master device performed, using the Mrand value received (S9080).

If the slave device's calculated Mconfirm value does not match the received Mconfirm value from the master device then the pairing process shall be aborted and the responding device shall send the Pairing Failed command with reason code "Confirm Value Failed".

If the slave device's calculated Mconfirm value matches the received Mconfirm value from the master device the responding device transmits Srand to the master device (S9090).

The master device verifies the received Sconfirm value by repeating the calculation the slave device performed, using the Srand value received (S9100).

If the master devices calculated Sconfirm value does not match the received Sconfirm value from the slave device then the pairing process shall be aborted and the master device shall send the Pairing Failed command with the reason code "Confirm Value Failed".

If the master device's calculated Sconfirm value matches the received Sconfirm value from the slave device the initiating device then calculates STK and tells the Controller to enable encryption.

STK is generated using the key generation function s1 as shown in Equation 3 below with the input parameter k set to TK, the input parameter r1 set to Srand, and the input parameter r2 set to Mrand (S9110).

$$STK = s1(TK, \text{Srand, Mrand}) \quad [\text{Equation 3}]$$

If the encryption key size is less than 128 bits then the STK shall be masked to the correct key size.

The master device shall use the generated STK to either enable encryption on the link or if encryption has already been enabled, perform the encryption pause procedure.

FIG. 10 is a flowchart illustrating another example of the pairing procedure when Bluetooth LE connection is established.

Referring to FIG. 10, devices supporting Bluetooth LE can establish secure connection through a secure connection procedure.

Steps S10010 and S10020 are identical to steps S9010 and S9020 of FIG. 9 and thus description thereof is omitted.

Subsequently, when the master device and the slave device support OOB, secure connection is established through OOB.

Specifically, the two devices exchange public keys. The master device transmits its public key to the slave followed by the slave transmitting its public key to the master (S10030 and S10040).

Then, the master device compares a confirm value of the slave device, received through OOB, with a confirm value thereof and the slave device checks whether the confirm value of the master device, received through OOB, is identical to the confirm value thereof (S10050).

When the confirm value of the master device is not identical to the conform value of the slave device, the secure connection procedure fails.

However, when the confirm value of the master device is identical to the confirm value of the slave device, the master device and the slave device select the value Nx described in FIG. 7 (S10060) and transmit the selected value Nx to the counterpart devices (S10070 and S10080).

Through the aforementioned method, the devices can establish secure connection.

When secure connection is performed between the two devices through the aforementioned method, however, an encryption key length may be limited according to computing power of the devices. In addition, when input and output units of the devices are restricted (e.g., when input units and/or output units are not present), Passkey Entry and Numeric Comparison cannot be used and thus it is impossible to support safe authentication from man in middle attack which manipulates network communication to wiretap or manipulate communication contents.

To solve such problems, accordingly, a method for establishing secure connection between devices through a control device that is a third device capable of providing a high security level is proposed.

FIG. 11 is a flowchart illustrating an example of a bonding method in Bluetooth LE.

Referring to FIG. 11, a bonding procedure for forming bonding between devices is performed when a device that is not bonded attempts to access a bonding request service. The bonding procedure may be performed to generate a bond between two devices.

Specifically, while a device is in the Peripheral or the Central role the device may support the Bonding procedure. While a device is in the Broadcaster or the Observer role the device shall not support the bonding procedure.

The Host of the Central initiates the pairing process as with the Bonding_Flags set to Bonding. If the peer device is in the bondable mode, the devices shall exchange and store the bonding information in the security database.

If a device supports the generation of resolvable private addresses and generates a resolvable private address for its local address, it shall send Identity Information with SMP (Secure Manager Protocol), including a valid IRK. If a device does not generate a resolvable private address for its own address and the Host sends Identity Information with SMP, the Host shall send an all-zero IRK. The Host can abort the pairing procedure if the authentication requirements are not sufficient to distribute the IRK.

When the central device and the peripheral device access a bonding request service after forming a link, the central device performs an SM (Secure Manager) pairing procedure with the peripheral device (S11010 and S11020).

Then, the central device and the peripheral device store bonding information of paired devices and update a list of paired devices (S11030).

The bonding information includes information (e.g., security information, identification information, etc.) used for secure connection in the aforementioned pairing procedure.

The devices can form bonds with paired devices and store bonding information through the above-described method.

FIG. 12 illustrates an example of a method for establishing secure connection between devices controlled by a control device to which the present invention is applied.

As illustrated in FIG. 12, the control device may establish secure connection between first and second devices to establish secure connection.

That is, the control device forms secure connection between the first and second devices and stores information for establishing secure connection of a predetermined level or higher between the first and second devices.

Then, the control device transmits the stored information to the first and second devices to control the first and second devices to establish secure connection such that the first and second devices can establish secure connection with a high security level.

FIG. 13 is a flowchart illustrating an example of a method for forming secure connection between devices controlled through a control device to which the present invention is applied.

Referring to FIG. 13, the control device may perform secure connection with the first and second devices and then transmit bonding information for establishment of secure connection to the first and second devices to control the first and second devices to establish secure connection.

First of all, it is assumed that the control device 500 includes an input unit and/or an output unit and thus forms secure connection of a high security level.

Specifically, the control device 500 may form secure connection (first connection and second connection) with the first device 300 and the second device 400 through a safe channel (e.g., Bluetooth, NFC or the like) using the methods described with reference to FIGS. 6 to 11 (S13010, S13020).

That is, the control device 500 and the first and second devices 300 and 400 can establish secure connection through connection and pairing procedures through a safe channel.

Here, the control device 500 may form secure connection of a predetermined security level or higher with the first and second devices 300 and 400 through a method such as out of band.

Upon establishment of secure connection, the control device 500 transmits a request message for requesting the following information for secure connection establishment to the first device 300 and the second device 400.

Bluetooth Address: a Bluetooth MAC address used in a device.

Public Key: a public key of a Bluetooth device.

Maximum Encryption Key Size: a maximum key length supported during encryption (7 to 16 octets).

Key Distribution: a key type that needs to be distributed and/or generated.

Then, the control device 500 receives response messages including the requested information from the first device 300 and the second device 400 and separately stores the information included in the received response messages of the first device 300 and the second device 400.

The control device generates information used for the first device 300 to perform procedures for connection and pairing with the second device 400 and bonding information used for the second device 400 to perform procedures for connection and pairing with the first device 300 on the basis of the stored information of the first and second devices 300 and 400 (S13030).

The following table 2 shows an example of data included in the bonding information.

TABLE 2

| Name | Requirement | Description |
| --- | --- | --- |
| Bonding Device Info | M | Device address and device name |
| Encryption Seed Key | O | Used to generate an encryption key used for data encryption. |

TABLE 2-continued

| Name | Requirement | Description |
| --- | --- | --- |
| Encryption Identification Value | O | Used to identify LTK during LE legacy pairing. |
| Random Value | O | Used to identify LTK during LE legacy pairing. |
| Identity Encryption Key | O | Key used to generate a random address and restore the same to a public address. |
| Message Authentication Key | O | Key used to authenticate a sign in a device that signs transmitted data. |

In Table 2, the bonding device info is mandatorily delivered, whereas the other data may be transmitted as required by the first device 300 and the second device 400.

The control device 500 transmits the generated bonding information to the first device 300 and the second device 400 (S13040).

Here, data of the information may be separately transmitted or included in a single message and transmitted.

Thereafter, the control device 500 transmits, to the second device 400, a command instructing the second device 400 to perform connection with the first device 300 based on the transmitted bonding information (S13050).

Upon reception of the command instructing the second device 400 to connect with the first device 300, the second device 400 can establish secure connection with the first device 300 on the basis of the bonding information transmitted from the control device 500 (S13060).

Here, a security level (third security level) of connection established between the first device 300 and the second device 400 may be identical to a security level (first security level) of connection formed between the control device 500 and the first device 300 or a security level (second security level) of connection formed between the control device 500 and the second device 400.

According to the aforementioned method, it is possible to establish connection of a high security level by transmitting bonding information for forming connection through the control device 500 even when the first device 300 and the second device 400 do not include input units and/or output units.

FIG. 14 is a flowchart illustrating another example of the method for forming secure connection between devices controlled by the control device to which the present invention is applied.

Referring to FIG. 14, the control device may form secure connection with the first and second devices and then transmit OOB information for secure connection establishment to the first and second devices such that the first and second devices form secure connection.

First, it is assumed that the control device 500 can form secure connection of a high security level because the control device 500 includes an input unit and/or an output unit.

Specifically, the control device 400 can form secure connection with the first device 300 and the second device 400 through a safe channel (e.g., Bluetooth, NFC or the like) using the methods described with reference to FIGS. 6 to 11 (S4010 and S14020).

That is, the control device 400 can form secure connection with the first device 300 and the second device 400 through a safe channel by performing the pairing procedure.

Here, the control device 500 can form secure connection of a predetermined level or higher with the first device 300 and the second device 400 though a method such as out of band.

In addition, the control device 500 can additionally store the following information from among pairing capability information illustrated in FIG. 14(b) according to the devices through a procedure of pairing with the first device 300 and the second device 400.

Maximum Encryption Key Size: a maximum key length (7 to 16 octets) supported during encryption.

Initiator Key Distribution: a key that needs to be distributed and/or generated (indicated through bit setting).

Responder Key Distribution: a key that needs to be distributed and/or generated (indicated through bit setting).

The control device 500 generates OOB information used for the first device 300 to perform procedures for connecting and pairing with the second device and OOB information used for the second device 400 to perform procedures for connecting and pairing with the first device on the basis of the stored information of the first and second devices 300 and 400 (S14030).

The following table 3 shows an example of OOB information according to performed pairing procedure.

TABLE 3

| No | Name | Requirement | Description |
| --- | --- | --- | --- |
| 1 | LE legacy OOB information (TK) | M1 | OOB information used in case of connection through LE legacy pairing (prior to Bluetooth core Spec. v 4.1) |
|  | BT address | O | Bluetooth device address |
| 2 | LE secure conn OOB information (rx) LE secure conn OOB information (Cx) | M2 | OOB information used in case of LE secure connection (after Bluetooth core Spec. v 4.2) rx: random number generated in device x Cx: commitment value generated in device x |
|  | BT address | O | Bluetooth device address |
| 3 | Secure simple pairing OOB information (rx) Secure simple pairing OOB information (Cx) | M3 | OOB information used in case of BR/EDR connection rx: random number generated in device x Cx: commitment value generated in device x |
|  | BT address | O | Bluetooth device address |

The control device 500 selects one piece of OOB information of 1, 2 and 3 of Table 3 depending on the pairing procedure to be performed between the first device 300 and the second device 400 and transmits the selected OOB information to the first device 300 and the second device (S14040).

Here, the OOB information may not include a BT address.

Then, the control device 500 transmits, to the second device 400, a command instructing the second device 400 to perform connection with the first device 300 based on the transmitted OOB information (S14050).

Upon reception of the command instructing the second device 400 to connect with the first device 300, the second device 400 can form connection with the first device 300 through OOB on the basis of the OOB information transmitted from the control device 500 (S14060).

Here, a security level of connection formed between the first device 300 and the second device 400 may be identical to a security level of connection formed between the control device 500 and the first device 300 or a security level of connection formed between the control device 500 and the second device 400.

According to the aforementioned method, the first device 300 and the second device 400 can establish connection of a high security level by receiving OOB information for forming connection through the control device 500 even when the first device 300 and the second device 400 do not include input units and/or output units.

FIG. 15 is a flowchart illustrating another example of the method for forming secure connection between devices controlled by the control device to which the present invention is applied.

Referring to FIG. 15, upon beginning an authentication procedure, the first device 300 and the second device 400 may request and acquire OOB information from the control device and form connection of a predetermined security level or higher on the basis of the acquired OOB information.

Steps S15010 to S15030 are identical to steps S14010 to S14030 and thus description thereof is omitted.

Upon generation of OOB information, the control device 500 transmits, to the second device 400, a command instructing the second device 400 to connect with the first device 300 (S15040).

Upon reception of the command from the control device, the second device 400 performs a procedure for Bluetooth LE connection described with reference to FIG. 8 to form connection with the first device 300.

Specifically, the second device 400 discovers the first device 300 by receiving an advertisement message transmitted from the first device 300 and transmits a connection request message to the first device 300 (S15050, S15060).

Then, the second device 400 transmits a pairing request message to the first device 300 and receives a pairing response message from the first device (S15070 and S15080).

Upon reception of the pairing response message by the second device 400, an authentication procedure is started between the first device 300 and the second device 400 for device authentication through OOB.

The second device 400 transmits, to the control device 500, a message for requesting OOB information for forming connection of a predetermined level or higher in order to form secure connection with the first device 300 through the authentication procedure (S15090).

The control device transmits a response message including the OOB information generated in step S15030 to the second device 400 (S15100).

In addition, the first device 300 also transmits an OOB information request message to the control device in order to form secure connection of a predetermined level or higher with the second device 400 and receives a response message including the OOB information from the control device 500 (S15110 and S15120).

Here, the control device 500 selects one piece of the OOB information shown in Table 3 depending on the pairing/connection procedure performed by the first device 300 and the second device 400 for secure connection and transmits the selected OOB information to the first device 300 and the second device 400.

For example, the control device 500 may transmit OOB information including the information of 1 in Table 3 to the first device and the second device when the first device 300 and the second device 400 perform the Bluetooth BR/EDR pairing procedure.

Further, the control device 500 may transmit OOB information including the information of 2 in Table 3 to the first device 300 and the second device 400 when the first device 300 and the second device 400 perform the Bluetooth LE legacy pairing procedure.

In addition, the control device 500 may transmit OOB information including the information of 3 in Table 3 to the first device 300 and the second device 400 when the first device 300 and the second device 400 perform the Bluetooth LE secure connection procedure.

The first device 300 and the second device 400 can perform mutual device authentication and form connection through OOB on the basis of the OOB information transmitted from the control device 500.

Here, a security level of connection formed between the first device 300 and the second device 400 may be identical to a security level of connection formed between the control device 500 and the first device 300 or a security level of connection formed between the control device 500 and the second device 400.

According to the aforementioned method, the first device 300 and the second device 400 can establish connection of a high security level by receiving OOB information for forming connection through the control device 500 even when the first device 300 and the second device 400 do not include input units and/or output units.

FIG. 16 is a flowchart illustrating an example of a method for acquiring information for forming secure connection between devices controlled by the control device in Bluetooth LE to which the present invention is applied.

Referring to FIG. 16, the control device 500 may acquire information used for the first device 300 and the second device 400 to form connection of a predetermined security level or higher in a process of forming connection with the first device 300 and the second device 400.

The procedure for forming Bluetooth LE connection in FIG. 16 is identical to the procedure described with respect to FIG. 8 and thus redundant description will be omitted.

The control device 500 may discover the first device 300 by receiving an advertisement message transmitted from the first device 300 to a client device through three advertisement channels (S16010).

The advertisement message includes a MAC address used by the first device 300 in Bluetooth and the control device 500 may store the MAC address of the first device 300 through the advertisement message transmitted from the first device 300.

Upon discovery of the first device 300, the control device 500 transmits, to the first device 300, a connection request for setting connection with the first device 300 (S16020).

Accordingly, link layer (LL) connection is established between the control device 500 and the first device 300.

Thereafter, the control device 500 and the first device 300 perform a security establishment procedure through phase 1 to phase 3 steps.

Specifically, the control device 500 transmits a pairing request message to the first device to perform a pairing procedure (phase 1) with the first device 300 and the first device 300 transmits a pairing response message to the control device 500 (S16030 and S16040).

FIG. 16(*a*) illustrates an example of a packet format of the pairing request message and the pairing response message.

The control device 500 may check "maximum encryption key size" and "key distribution" of the first device 300 through the pairing response message and store the same.

In phase 2, legacy pairing or secure connection is performed between the server device and the client device (S16050).

Here, legacy pairing or secure connection may be performed through numeric comparison, passkey entry or out of band (or protocol) in order to form connection of a high security level between the control device 500 and the first device 300.

The control device 500 may acquire and store a public key of the first device 300 through the legacy pairing or secure connection process.

Then, a key distribution procedure is performed between the server device and the client device in SSP phase 3 (S16060).

According to the aforementioned method, the control device 500 can acquire information for forming secure connection with the first device 300, generate the bonding information or the OOB information described with reference to FIGS. 13 to 15 on the basis of the acquired information and transmit the bonding information or OOB information to the second device 400 to control the second device 400 to form connection of a high security level with the first device 300.

The procedure described with reference to FIG. 16 may be equally performed between the control device 500 and the second device 400, and the control device 500 can acquire information for forming secure connection with the second device 400 through the procedure, generate the bonding information or OOB information described with reference to FIGS. 13 to 15 on the basis of the acquired information and transmit the generated information to the first device 300.

FIGS. 17 and 18 illustrate an example of a method for forming secure connection between devices controlled through the control device in Bluetooth LE to which the present invention is applied and an example of characteristics.

Referring to FIGS. 17 and 18, the control device 500 may store information for forming secure connection between the first device 300 and the second device 400 through Bluetooth LE secure connection and control the first device 300 and the second device 400 to form high security level connection on the basis of the stored information.

Specifically, the control device 500 may store information related to pairing for secure connection between the first device 300 and the second device 400 through the Bluetooth LE secure connection procedure described with reference to FIG. 16 respectively for the first device 300 and the second device 400 (S17010 and S17020).

The control device 500 generates bonding information for forming secure connection between the first device 300 and the second device 400 on the basis of the stored pairing related information (S17030).

The generated bonding information may include data shown in Table 2.

The control device 500 transmits a write request message including the bonding information to the second device 400 and the first device 300 in order to request writing of the generated bonding information in GATT based characteristics of the second device 400 and the first device 300 (S17040 and S17060).

The second device 400 and the first device 300 may transmit, to the control device 500, a write response message indicating whether the write request message has been successfully received from the control device 500 (S17050 and S17070).

When the second device 400 and/or the first device 300 transmit a write response message indicating write request message reception failure to the control device 500, the control device 500 may re-transmit the write request message including the bonding information to the second device 400 and/or the first device 300.

Upon successful reception of the write request message, the second device 400 and the first device 300 write data included in the bonding information in the characteristics shown in FIG. 18.

The characteristics shown in FIG. 18 are as follows.

Bonding Device Info: the address and/or the name of a device corresponding to bonding information.

Long Term Key (LTK): a 128-bit key used to generate a contributory session key with respect to encrypted connection.

Encrypted Diversifier (EDIV): a 16-bit stored value used to identify an LTK distributed during LE legacy pairing. A new EDIV is generated whenever a unique LTK is distributed.

Random Number (Rand): a 64-bit stored value used to identify an LTK distributed during LE legacy pairing. A new RAND is generated whenever a unique LTK is distributed.

Identity Resolving Key (IRK): a 128-bit key used to generate and resolve a random address.

Connection Signature Resolving Key (CSRK): a 128-bit key used to check signatures in a data signature and reception device.

Connection Command: a characteristic for controlling device connection delivered from the control device.

Upon successful reception of the write request message by the first device 300 and the second device 400, the control device 500 transmits, to the second device 400, a write request message for requesting writing of a connection command characteristic ordering connection with the first device 300 using the bonding information (S17080).

The second device 400 may transmit, to the control device 500, a write response message indicating whether the write request message has been successfully received from the control device 500 (S17090).

When the second device 400 transmits a write response message indicating write request message reception failure to the control device 500, the control device 500 may re-transmit the write request message including the bonding information to the second device 400.

At the request of the control device 500 for writing of the connection command characteristic ordering connection with the first device 300, the second device 400 writes the connection command characteristic and forms connection with the first device 300 using the bonding information (S17100).

Here, a security level of connection formed between the first device 300 and the second device 400 may be identical to a security level of connection formed between the control device 500 and the first device 300 or a security level of connection formed between the control device 500 and the second device 400.

Upon formation of connection with the first device 300 using the bonding information, the second device 400 may transmit a notification message indicating a result of connection with the first device 300 to the control device 500 (S17110).

According to the aforementioned method, the first device 300 and the second device 400 can form high security level connection by receiving OOB information for establishing connection through the control device 500 even when the first device 300 and the second device 400 do not include input units and/or output units.

FIGS. 19 and 20 illustrate another example of the method for forming secure connection between devices controlled through the control device in Bluetooth LE to which the present invention is applied and another example of characteristics.

Referring to FIGS. 19 and 20, the control device 500 may store information for forming secure connection between the first device 300 and the second device 400 through Bluetooth LE secure connection and control the first device 300 and the second device 400 to form high security level connection through OOB on the basis of the stored information.

A description will be given of a case in which the first device 300 and the second device 400 form Bluetooth LE secure connection as an example.

Specifically, the control device 500 may store information related to pairing for secure connection between the first device 300 and the second device 400 through the Bluetooth LE secure connection procedure described with reference to FIG. 16 respectively for the first device 300 and the second device 400 (S19010 and S19020).

The control device 500 generates OOB information for pairing and connection between the first device 300 and the second device 400 through OOB on the basis of the stored pairing related information (S19030).

The generated OOB information may include data of 2 shown in Table 3.

The control device 500 transmits a write request message including the OOB information to the second device 400 and the first device 300 in order to request writing of the generated OOB information in GATT based characteristics of the second device 400 and the first device 300 (S19040 and S19060).

The second device 400 and the first device 300 may transmit, to the control device 500, a write response message indicating whether the write request message has been successfully received from the control device 500 (S19050 and S19070).

When the second device 400 and/or the first device 300 transmit a write response message indicating write request message reception failure to the control device 500, the control device 500 may re-transmit the write request message including the OOB information to the second device 400 and/or the first device 300.

Upon successful reception of the write request message, the second device 400 and the first device 300 write data included in the OOB information in the characteristics shown in FIG. 20.

The characteristics shown in FIG. 20 are as follows.

LE Legacy OOB information (TK): OOB information used for LE legacy pairing.

LE Secure Conn OOB information (rx): OOB information used for LE secure connection.

LE Secure Conn OOB information (Cx): OOB information used for LE secure connection.

Connection Command: characteristic for controlling device pairing/connection delivered from the control device.

Upon successful reception of the write request message by the first device 300 and the second device 400, the control device 500 transmits, to the second device 400, a write request message for requesting writing of a connection command characteristic ordering pairing/connection with the first device 300 using the OOB information (S19080).

The second device 400 may transmit, to the control device 500, a write response message indicating whether the write request message has been successfully received from the control device 500 (S19090).

When the second device 400 transmits a write response message indicating write request message reception failure to the control device 500, the control device 500 may re-transmit the write request message including the OOB information to the second device 400.

At the request of the control device 500 for writing of the connection command characteristic ordering connection with the first device 300, the second device 400 writes the connection command characteristic and forms pairing/connection with the first device 300 through OOB using the OOB information (S19100).

Here, a security level of connection formed between the first device 300 and the second device 400 may be identical to a security level of connection formed between the control device 500 and the first device 300 or a security level of connection formed between the control device 500 and the second device 400.

According to the aforementioned method, the first device 300 and the second device 400 can form high security level connection by receiving OOB information for forming connection through the control device 500 even when the first device 300 and the second device 400 do not include input units and/or output units.

Although Bluetooth LE secure connection has been described as an example in the present embodiment for convenience of description, the present invention is applicable to Bluetooth BR/EDR connection and Bluetooth LE legacy pairing.

FIG. 21 is a flowchart illustrating another example of the method for forming secure connection between devices controlled through the control device in Bluetooth LE to which the present invention is applied.

Referring to FIG. 21, the control device 500 may control connection between the first device 300 and the second device 400 by requesting writing of both the OOB information and the connection command characteristic.

Steps S21010 to S21030 are identical to steps S19010 to S19030 of FIG. 19 and thus description thereof will be omitted.

The control device 500 transmits the write request message including the OOB information to the second device 400 and the first device 300 in order to request writing of the generated OOB information and the connection command characteristic ordering pairing/connection in the characteristics shown in FIG. 20 (S21040 and S21060).

The second device 400 and the first device 300 may transmit, to the control device 500, a write response message indicating whether the write request message has been successfully received from the control device 500 (S21050 and S21070).

When the second device 400 and/or the first device 300 transmit a write response message indicating write request message reception failure to the control device 500, the control device 500 may re-transmit the write request message including the bonding information to the second device 400 and/or the first device 300.

Upon successful reception of the write request message, the second device 400 and the first device 300 write data included in the OOB information in the characteristics shown in FIG. 20 and perform pairing/connection through OOB using the written OOB information (S21080).

Here, a security level of connection formed between the first device 300 and the second device 400 may be identical to a security level of connection formed between the control device 500 and the first device 300 or a security level of connection formed between the control device 500 and the second device 400.

Although Bluetooth LE secure connection has been described as an example in the present embodiment for convenience of description, the present invention is applicable to Bluetooth BR/EDR connection and Bluetooth LE legacy pairing.

According to the method for controlling devices using Bluetooth according to an embodiment of the present invention, it is possible to control operations of devices through the control device.

In addition, according to the present invention, the control device including an input unit and an output unit can form secure connection with controlled devices using the Bluetooth technology such that the controlled devices can acquire and store information for forming secure connection.

Furthermore, according to the present invention, the control device can transmit stored information for forming secure connection between controlled devices to other controlled devices, thereby establishing high security level connection between controlled devices.

Effects obtainable from the present invention are non-limited by the above-mentioned effect and, other unmentioned effects can be clearly understood from the following description by those having ordinary skill in the technical field to which the present invention pertains.

Although the description of the present invention is explained with reference to each of the accompanying drawings for clarity, it is possible to design new embodiments by merging the embodiments shown in the accompanying drawings with each other. If a recording medium readable by a computer, in which programs for executing the embodiments mentioned in the foregoing description are recorded, is designed in necessity of those skilled in the art, it may be within the scope of the appended claims and their equivalents.

The method for connecting and controlling devices according to the present specification may be non-limited by the configurations and methods of the embodiments mentioned in the foregoing description. The embodiments mentioned in the foregoing description may be configured in a manner of being selectively combined with one another entirely or in part to enable various modifications.

In addition, a method according to the present invention may be implemented with processor-readable code in a processor-readable recording medium provided to a network device. The processor-readable medium may include all kinds of recording devices capable of storing data readable by a processor. The processor-readable medium may include one of ROM, RAM, CD-ROM, magnetic tapes, floppy disks, optical data storage devices, and the like for example and also include such a carrier-wave type implementation as transmission via the Internet. Furthermore, as the processor-readable recording medium is distributed to a computer system connected via a network, processor-readable code may be saved and executed according to a distributive system.

It will be appreciated by those skilled in the art that various modifications and variations may be made in the present invention without departing from the spirit or scope of the invention. Thus, it is intended that the present invention cover the modifications and variations of this invention provided they come within the scope of the appended claims and their equivalents.

Both apparatus and method inventions are mentioned in this specification and descriptions of both of the apparatus and method inventions may be complementarily applied to each other.

The present specification relates to control of devices using Bluetooth and, particularly, to a method and apparatus for forming connection between devices through a control device using Bluetooth low energy (LE) technology.

What is claimed is:

1. A method for controlling connection between a first device and a second device by a control device using Bluetooth Low Energy (LE), the method comprising:
    establishing a first security connection of a first security level with the first device in order to obtain first pairing information,
    wherein the first security connection is established based on passkey entry or numeric comparison;
    obtaining, from the first device, the first pairing information based on the first security connection;
    storing the first pairing information;
    establishing a second security connection of a second security level with the second device in order to obtain second pairing information,
    wherein the second security connection is established based on passkey entry or numeric comparison;
    obtaining, from the second device, the second pairing information based on the second security connection;
    storing the second pairing information;
    generating first out of band (OOB) information for the first device and second OOB information for the second device, based on the first pairing information and the second pairing information,
    wherein the first OOB information and the second OOB information are used to establish a third security connection between the first device and the second device through a third security level supported by the first device or the second device;
    transmitting, to the first device, a first write request message including the first OOB information,
    wherein the first write request message requests for writing the first OOB information to generic attribute (GATT) based characteristics of the first device;
    transmitting, to the second device, a second write request message including the second OOB information, wherein the second write request message requests for writing the second OOB information to generic attribute (GATT) based characteristics of the second device; and transmitting, to the second device, a third write request message for requesting writing of a connection command characteristic ordering security connection with the first device using the second OOB information, wherein the third security level is the same as the first security level or the second security level.

2. The method of claim 1, wherein the first pairing information includes at least one of an address of the first device, a public key of the first device, a maximum key size supported when the first device performs an encryption procedure or a key type generated and distributed when the first device establishes connection through a secure channel, and wherein the second pairing information includes at least one of an address of the second device, a public key of the second device, a maximum key size supported when the second device performs an encryption procedure or a key type generated and distributed when the second device establishes connection through a secure channel.

3. The method of claim 1, wherein the first OOB information includes at least one of an address of the second device, a first temporary key (TK) for performing legacy pairing, a first commitment value or a first random value, and wherein the second OOB information includes at least one of an address of the first device, a TK for performing legacy pairing, a second commitment value or a second random value.

4. The method of claim 1, further comprising:
receiving a notification message including a result of the third security connection from the first device.

5. A control device for controlling connection between a first device and a second device using Bluetooth Low Energy (LE), the control device comprising:
a transceiver;
a memory configured to store data; and
a processor functionally connected with the transceiver and the memory,
wherein the processor is configured to:
establish a first security connection of a first security level with the first device in order to obtain first pairing information,
wherein the first security connection is established based on passkey entry or numeric comparison,
obtain, from the first device, the first pairing information based on the first security connection,
store the first pairing information,
establish a second security connection of a second security level with the second device in order to obtain second pairing information,
wherein the second security connection is established based on passkey entry or numeric comparison,
obtain, from the second device, the second pairing information based on second security connection,
store the second pairing information,
generate first out of band (OOB) information for the first device and second OOB information for the second device, based on the first pairing information and the second pairing information,
wherein the first OOB information and the second OOB information are used to establish a third security connection between the first device and the second device through a third security level supported by the first device or the second device,
control the transceiver to transmit, to the first device, a first write request message including the first OOB information,
wherein the first write request message requests for writing the first OOB information to generic attribute (GAIT) based characteristics of the first device,
control the transceiver to transmit, to the second device, a second write request message including the second OOB information,
wherein the second write request message requests for writing the second OOB information to generic attribute (GATT) based characteristics of the second device, and
control the transceiver to transmit, to the second device, a third write request message for requesting writing of a connection command characteristic ordering security connection with the first device using the second OOB information,
wherein the third security level is the same as the first security level or the second security level.

6. The control device of claim 5, wherein the first pairing information includes at least one of a first address of the first device, a public key of the first device, a maximum key size supported when the first device performs an encryption procedure or a key type generated and distributed when the first device establishes connection through a secure channel, and wherein the second pairing information includes at least one of a second address of the second device, a public key of the second device, a maximum key size supported when the second device performs an encryption procedure or a key type generated and distributed when the second device establishes connection through a secure channel.

7. The control device of claim 5, wherein the first OOB information includes at least one of an address of the second device, a first temporary key (TK) for performing legacy pairing, a first commitment value or a first random value, and wherein the second OOB information includes at least one of an address of the first device, a second TK for performing legacy pairing, a second commitment value or a second random value.

8. The control device of claim 5, wherein the processor is configured to receive a notification message including a result of the third security connection from the first device.

* * * * *